United States Patent [19]

Wolf et al.

[11] Patent Number: 4,573,514

[45] Date of Patent: * Mar. 4, 1986

[54] ELECTRICALLY HEATABLE MOLD AND METHOD OF CASTING METAL STRAPS

[75] Inventors: Alby H. Wolf, Minneapolis; Thomas L. Oswald, Roseville, both of Minn.

[73] Assignee: GNB Batteries Inc., Mendota Heights, Minn.

[*] Notice: The portion of the term of this patent subsequent to Aug. 13, 2002 has been disclaimed.

[21] Appl. No.: 380,826

[22] Filed: May 21, 1982

[51] Int. Cl.⁴ .................. B22D 27/04; B22D 5/02; B22D 19/00

[52] U.S. Cl. ...................... 164/4.1; 164/102; 164/103; 164/130; 164/326; 164/338.1; 164/DIG. 1

[58] Field of Search .............. 164/DIG. 1, 102-103, 164/129, 130, 325-326, 329, 332, 334, 338.1, 4.1

[56] References Cited

U.S. PATENT DOCUMENTS

| | | |
|---|---|---|
| 575,115 | 1/1897 | Hunt .................. 164/338.1 |
| 2,978,762 | 4/1961 | McAlpine ............... 164/DIG. 1 |
| 3,444,920 | 5/1969 | McAlpine ............... 164/108 |
| 3,504,731 | 4/1970 | Farmer ................. 164/334 X |
| 3,547,183 | 10/1970 | Clingenpeel ............ 164/333 |
| 3,616,845 | 11/1971 | Farmer ................. 164/DIG. 1 X |
| 3,802,488 | 4/1974 | Hull et al. ............ 164/270 |
| 3,988,169 | 10/1976 | McLean ................. 29/623.1 |
| 4,144,927 | 3/1979 | Emerton et al. ......... 164/108 |
| 4,180,120 | 10/1979 | Eberle ................. 164/109 |
| 4,241,780 | 10/1980 | Eberle ................. 164/333 |
| 4,284,122 | 8/1981 | Oxenreider et al. ...... 164/DIG. 1 X |
| 4,289,193 | 9/1981 | Stamp .................. 164/DIG. 1 |
| 4,351,106 | 9/1982 | Brady .................. 29/730 |

FOREIGN PATENT DOCUMENTS

| | | |
|---|---|---|
| 713716 | 8/1954 | United Kingdom . |
| 940414 | 10/1963 | United Kingdom . |
| 1242964 | 8/1971 | United Kingdom . |
| 1385674 | 2/1975 | United Kingdom . |
| 1486090 | 9/1977 | United Kingdom . |
| 1505374 | 3/1978 | United Kingdom . |
| 2084435 | 4/1982 | United Kingdom . |
| 2014829 | 5/1982 | United Kingdom . |

Primary Examiner—Nicholas P. Godici
Assistant Examiner—Richard K. Seidel
Attorney, Agent, or Firm—Augustus J. Hipp; Dennis R. Schlemmer

[57] ABSTRACT

A method of casting metal straps on lugs of battery cell elements utilizes an electrically heatable mold having a strap cavity section and comprises introducing strap metal into the cavity section, conducting electrical current through the mold for heating the mold to a predetermined temperature in excess of the melting temperature of the strap metal, immersing the element lugs into the cavity, cooling the mold to a temperature below the solidification temperature of the strap metal and removing the element lugs from the cavity with straps cast thereon.

20 Claims, 49 Drawing Figures

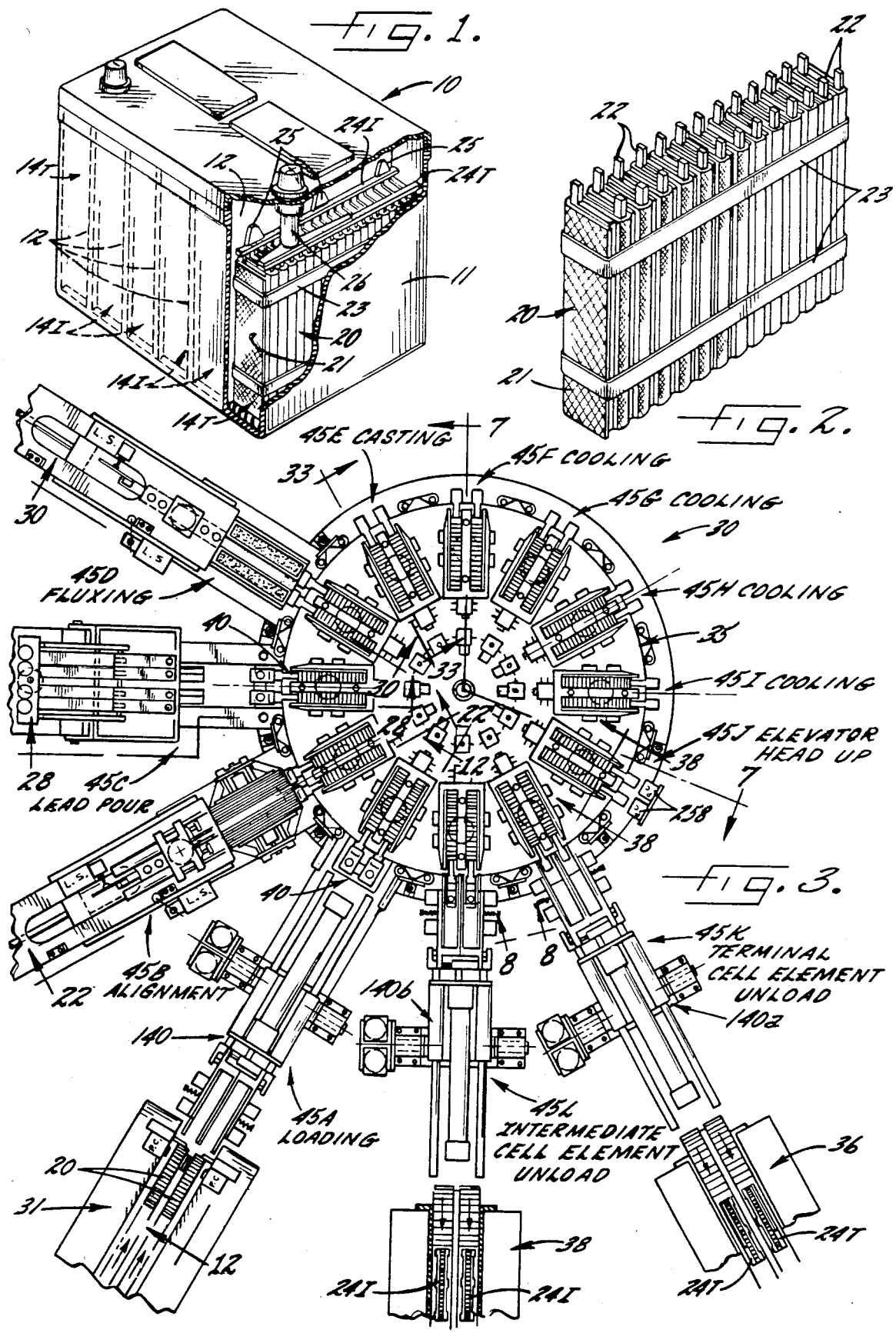

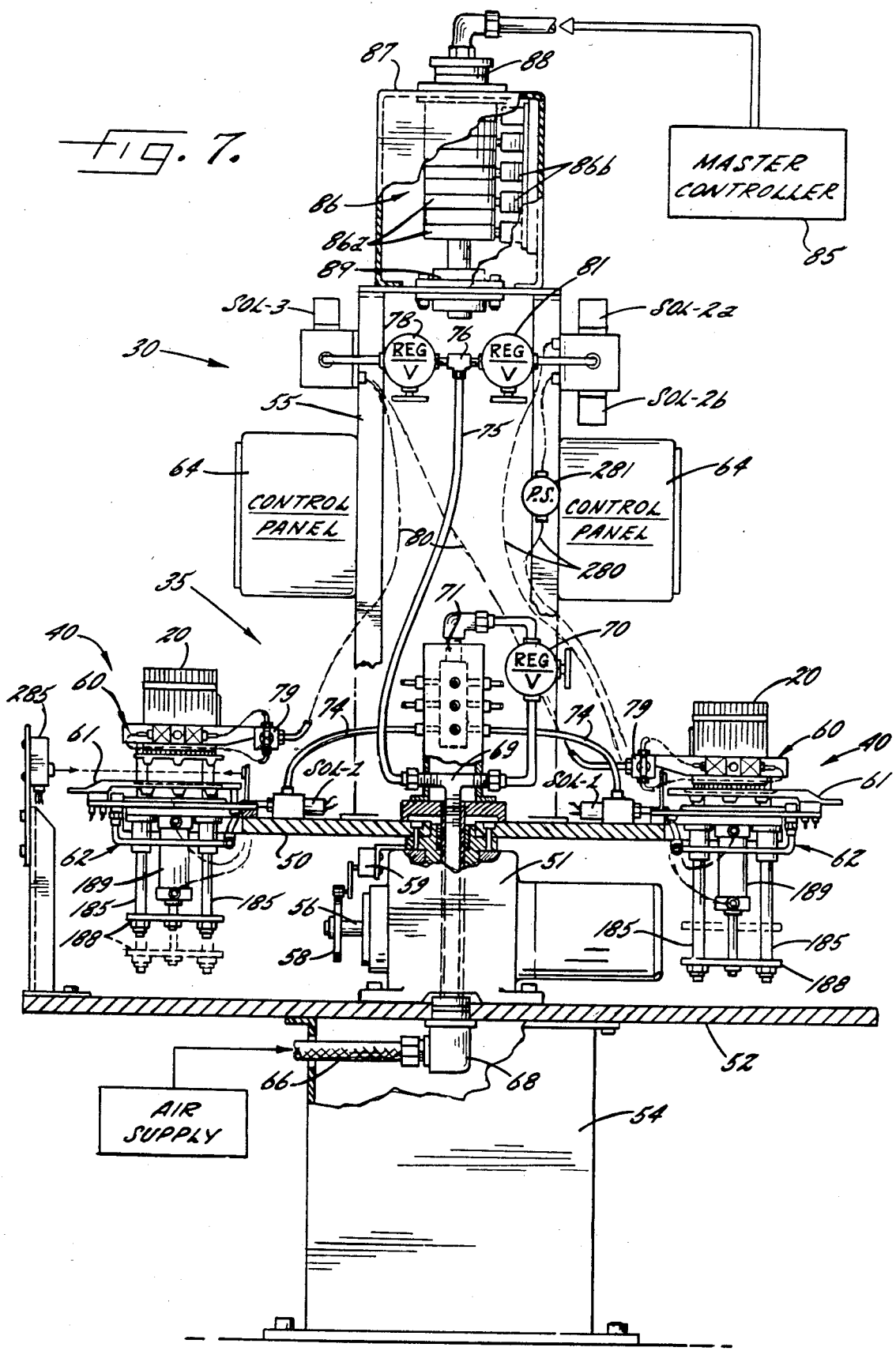

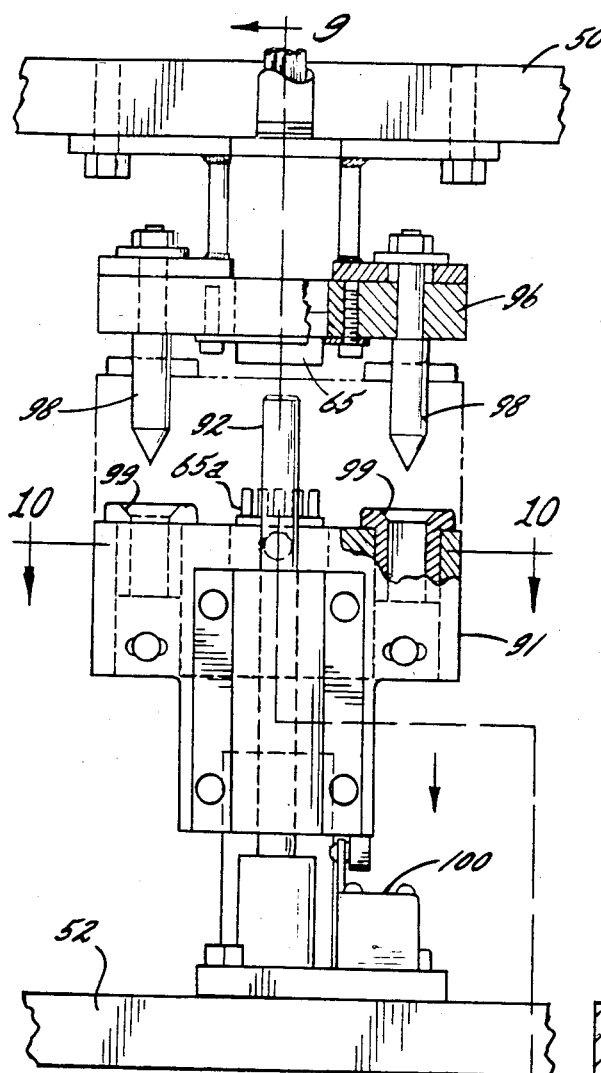
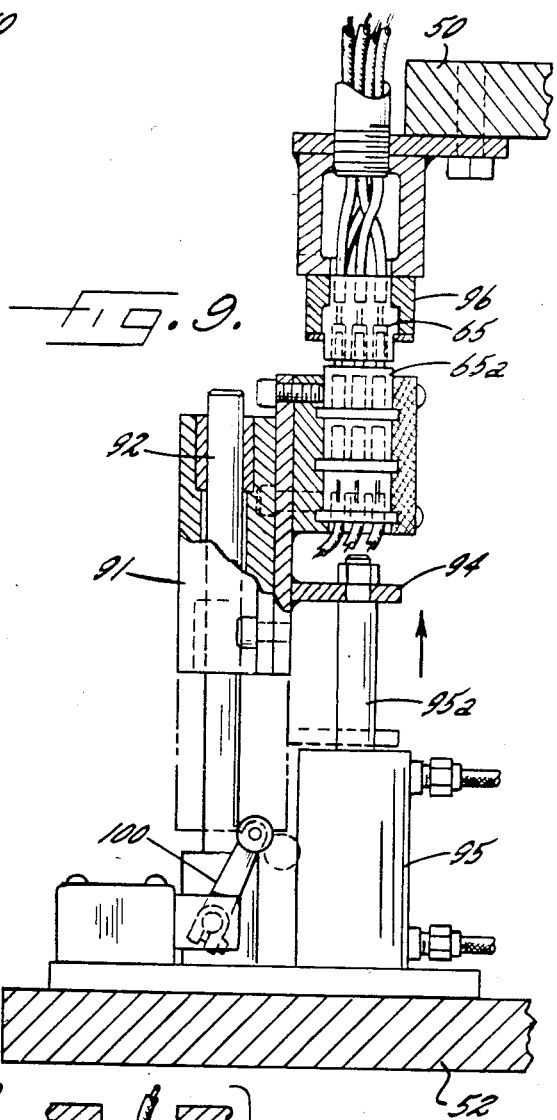
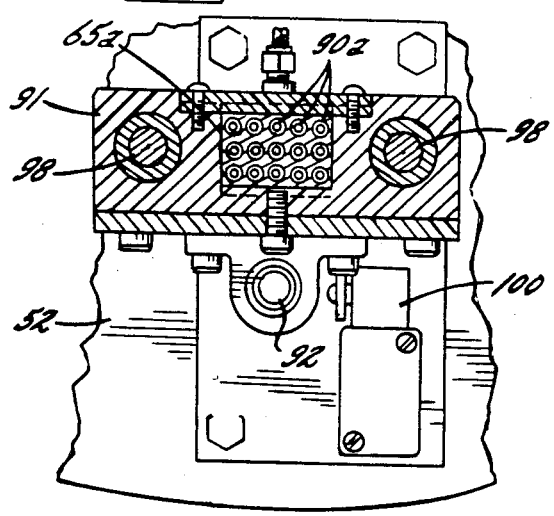
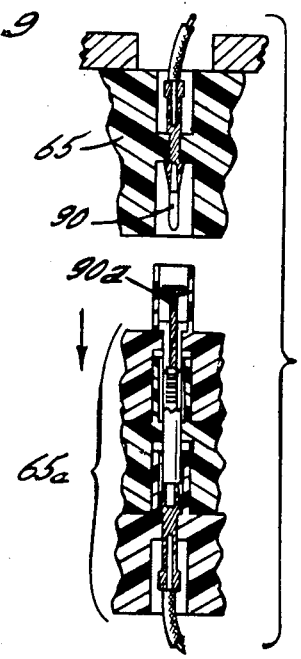

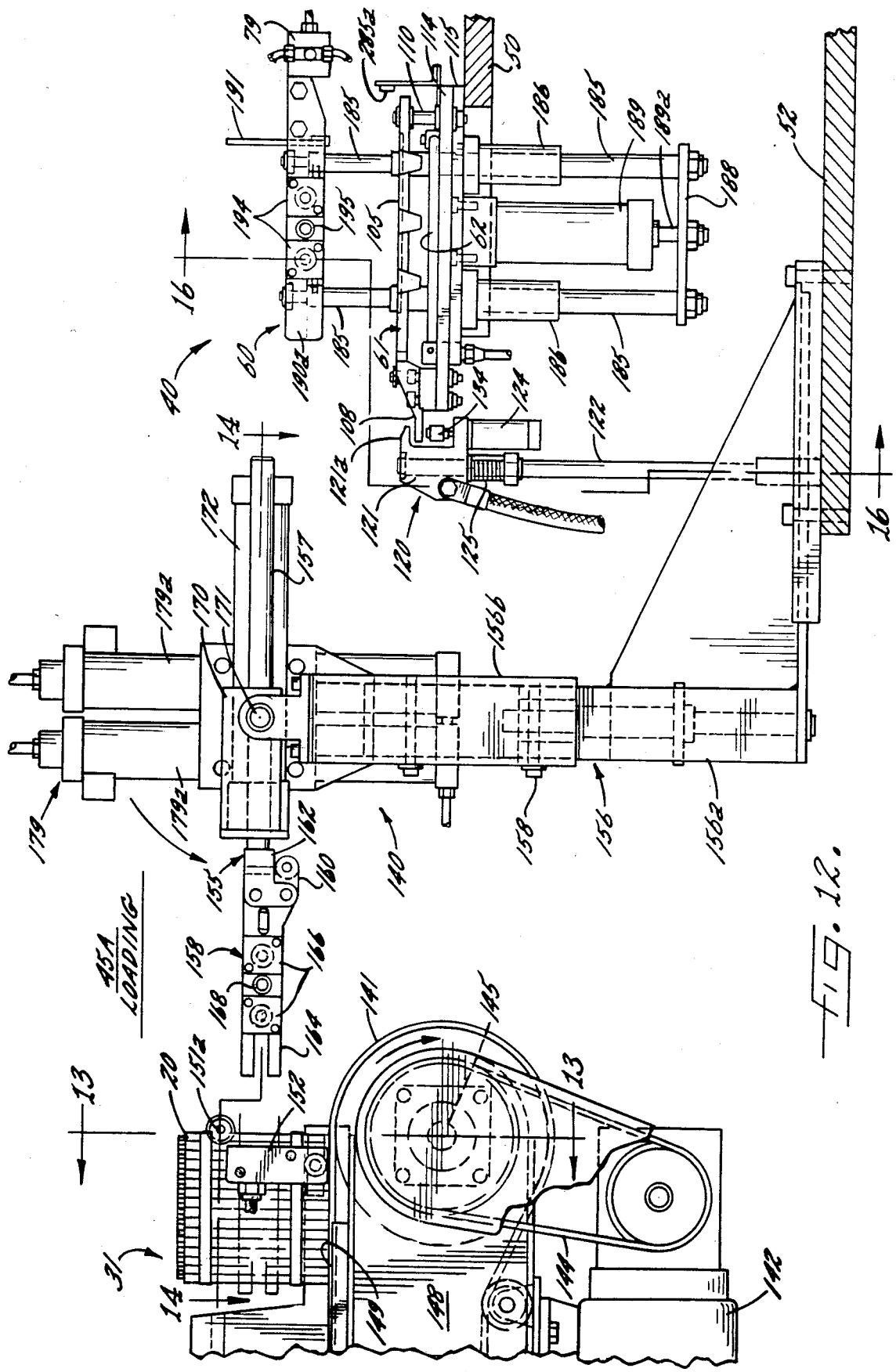

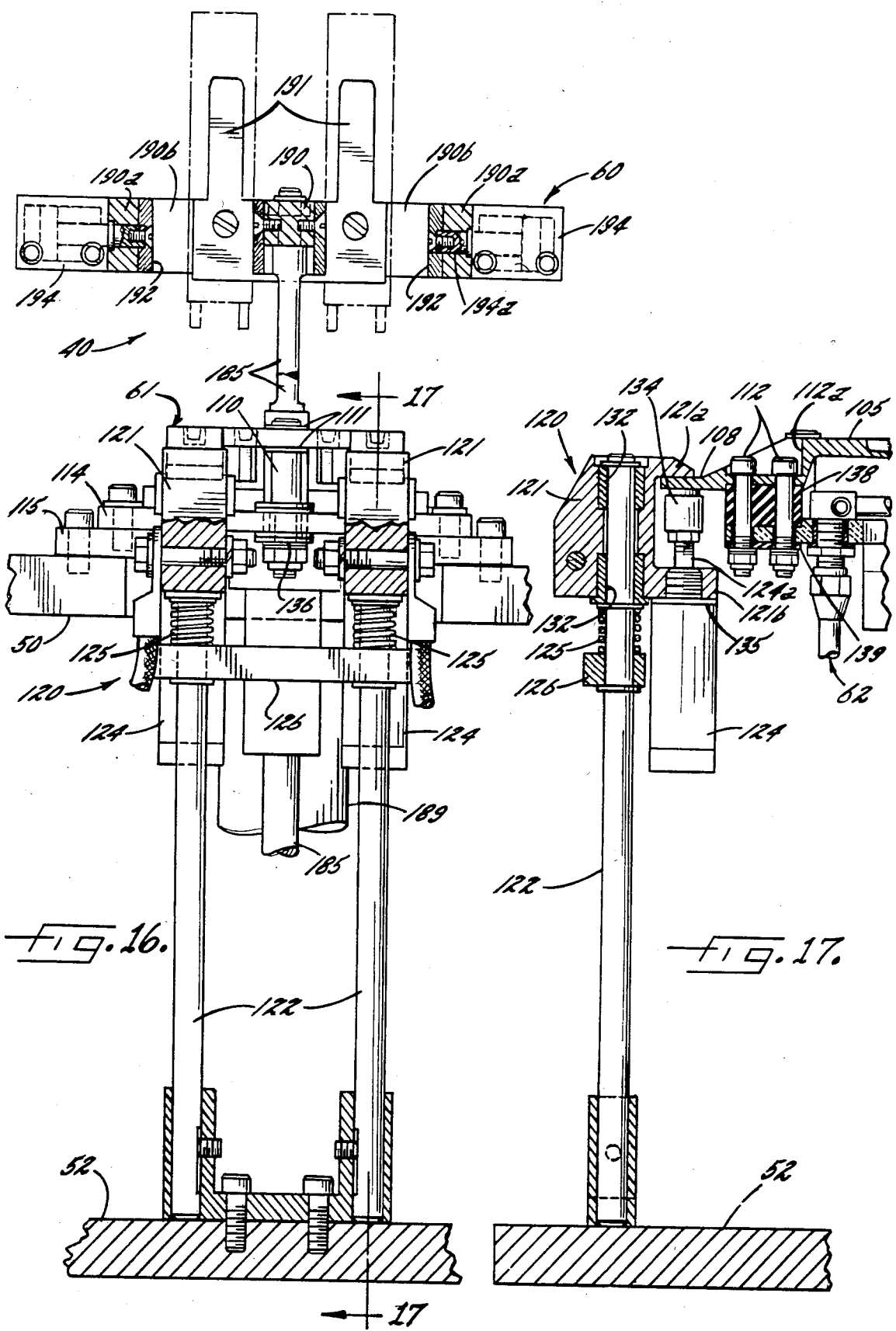

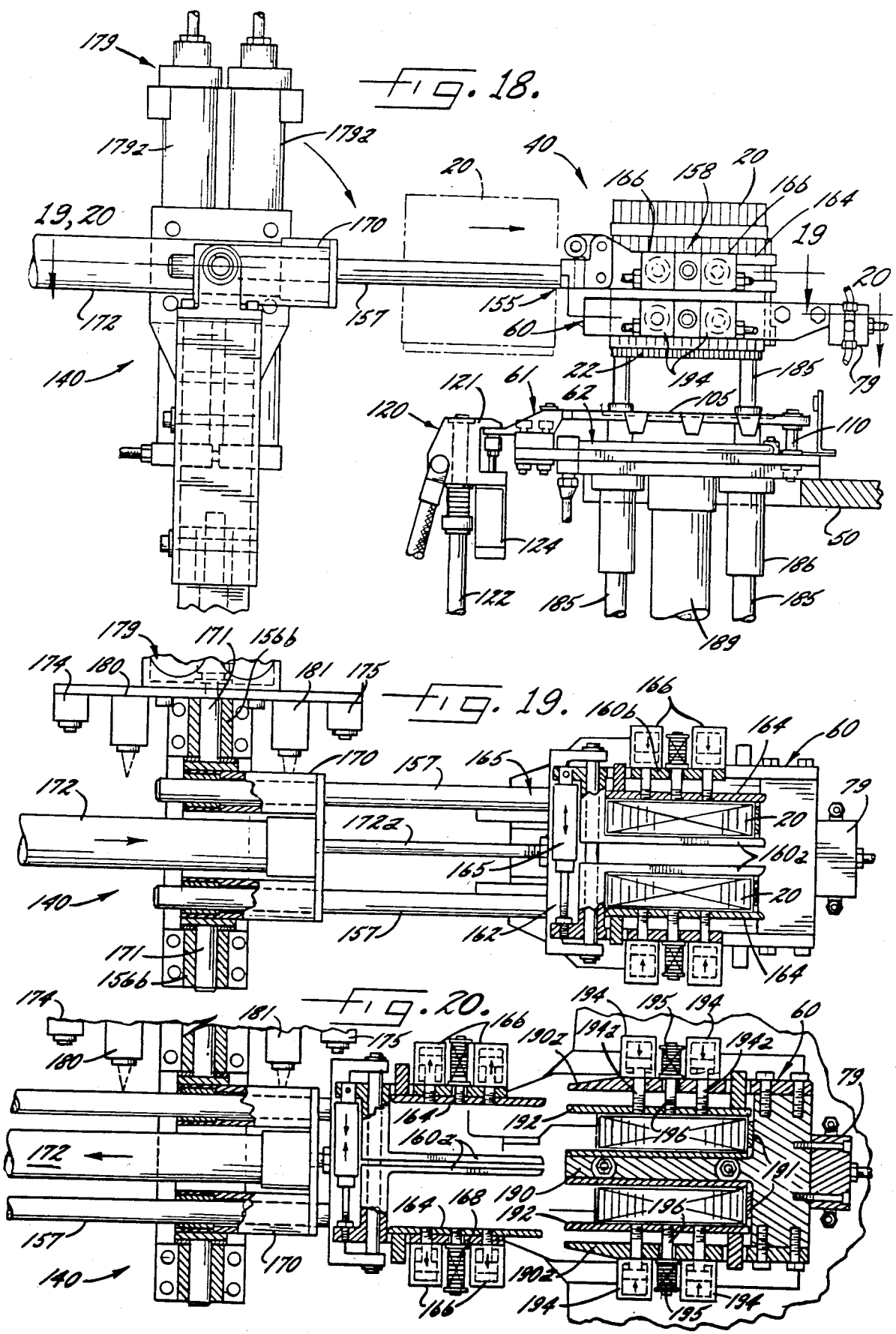

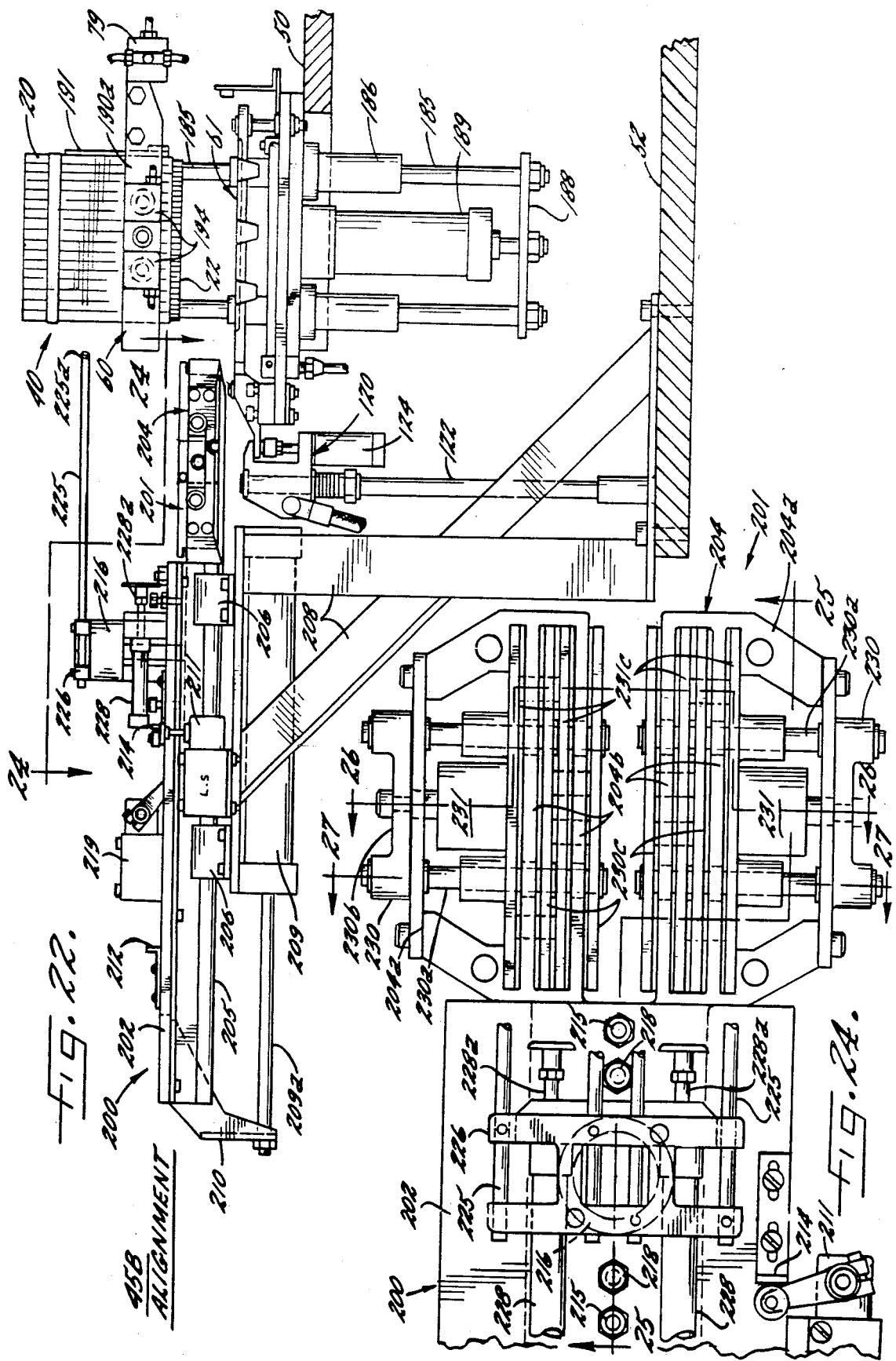

45C LEAD POUR

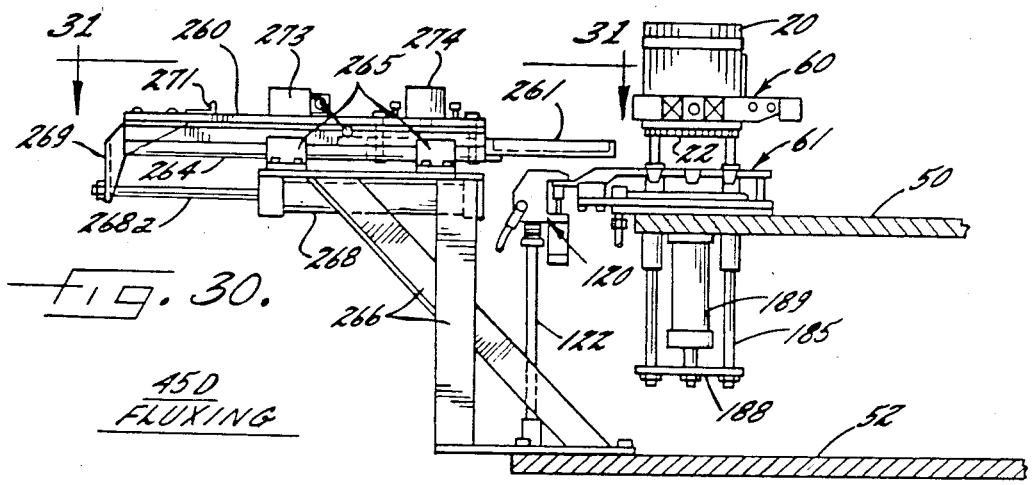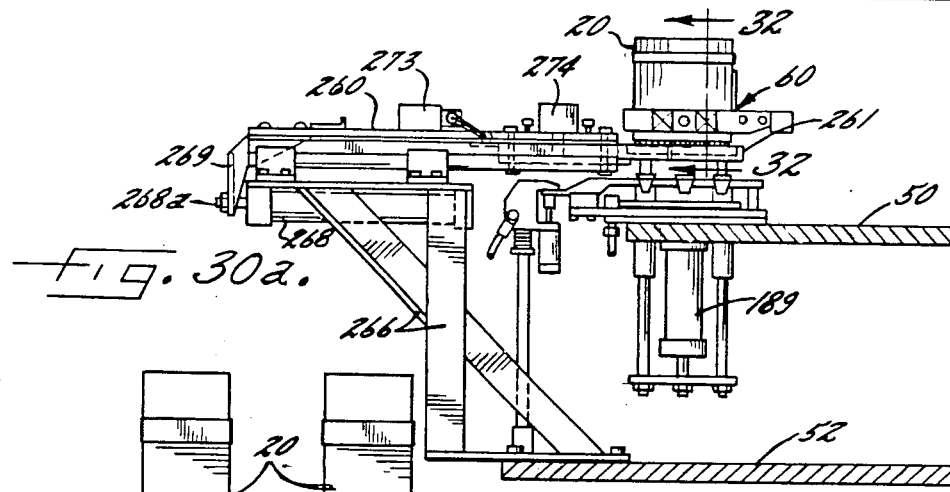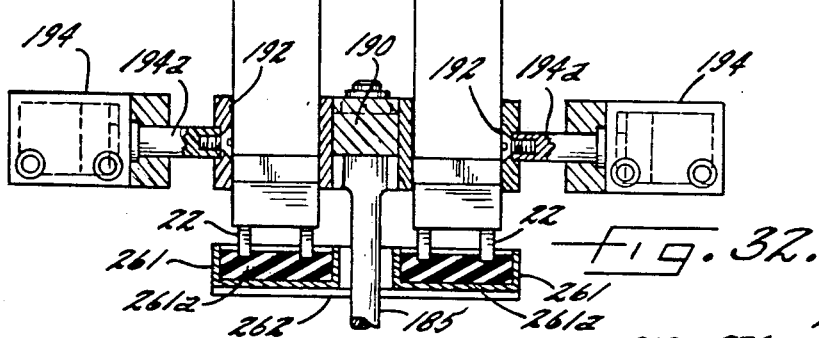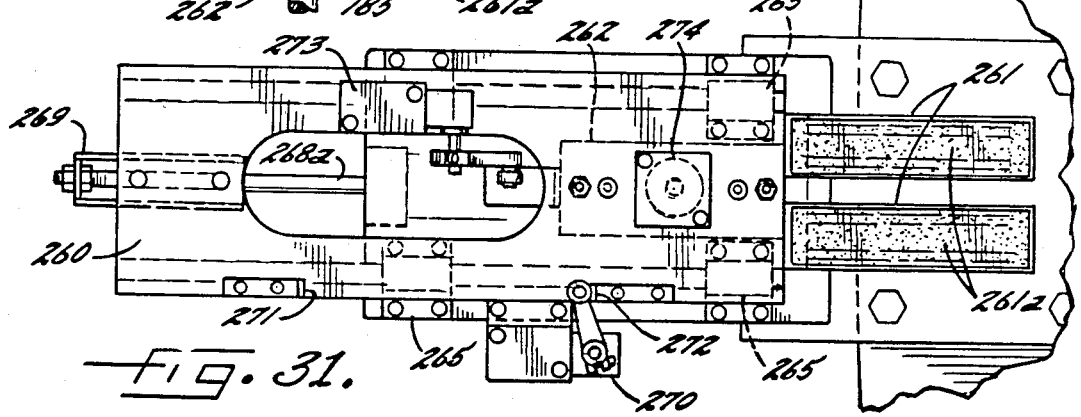

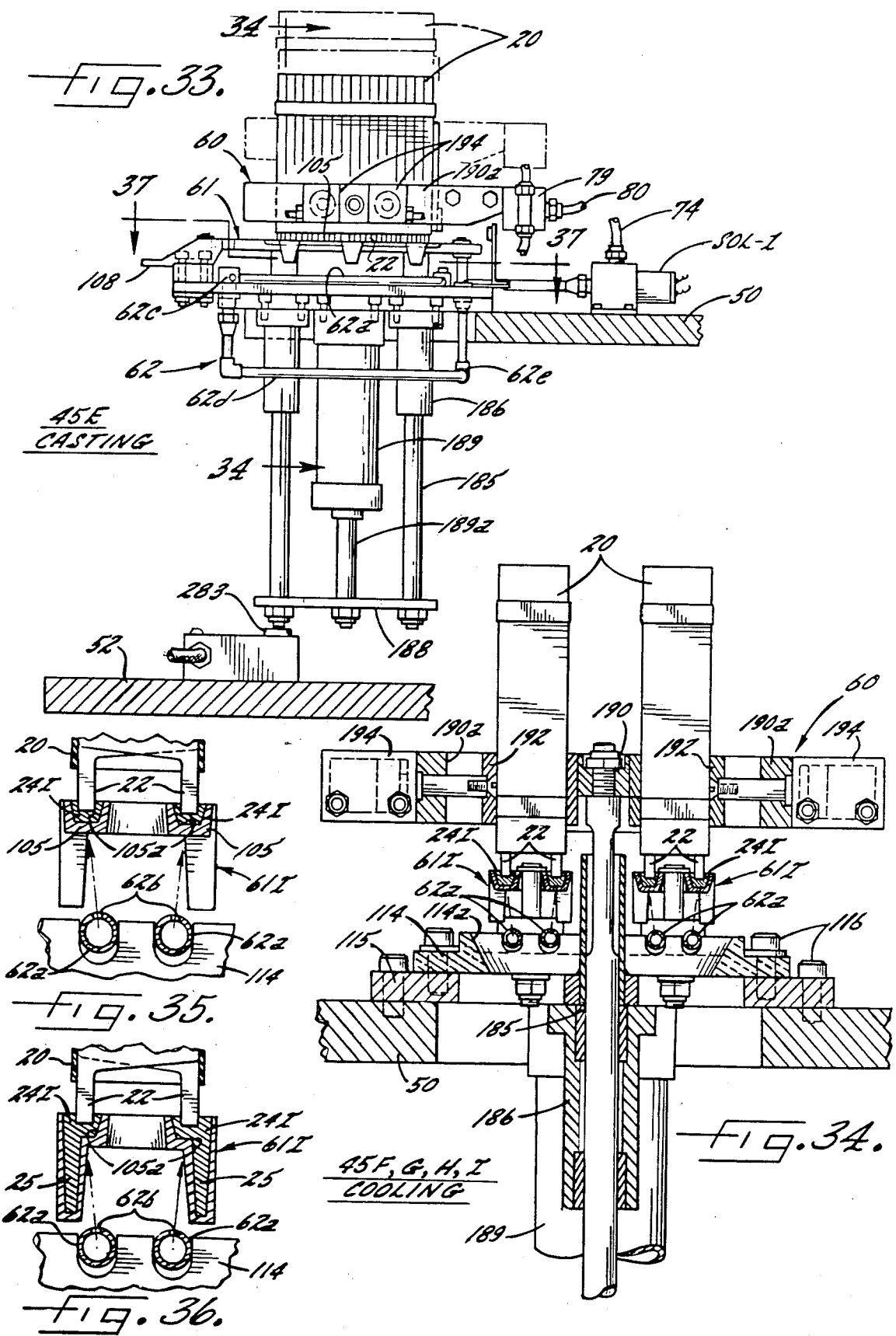

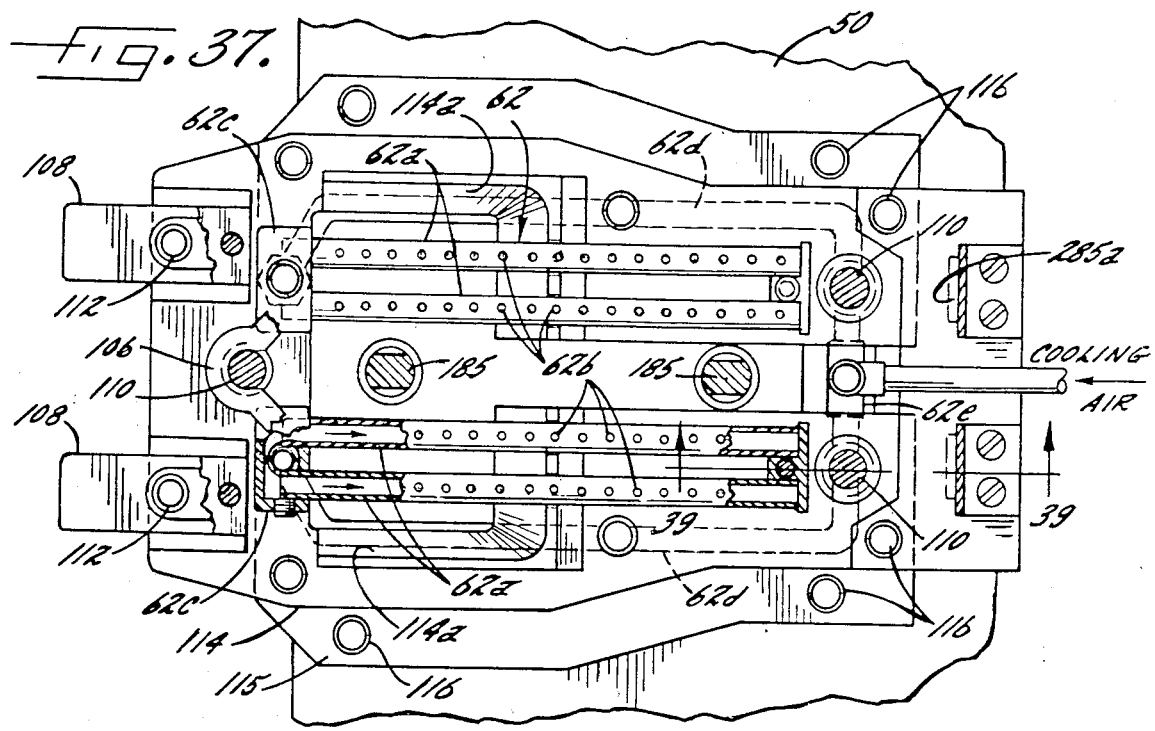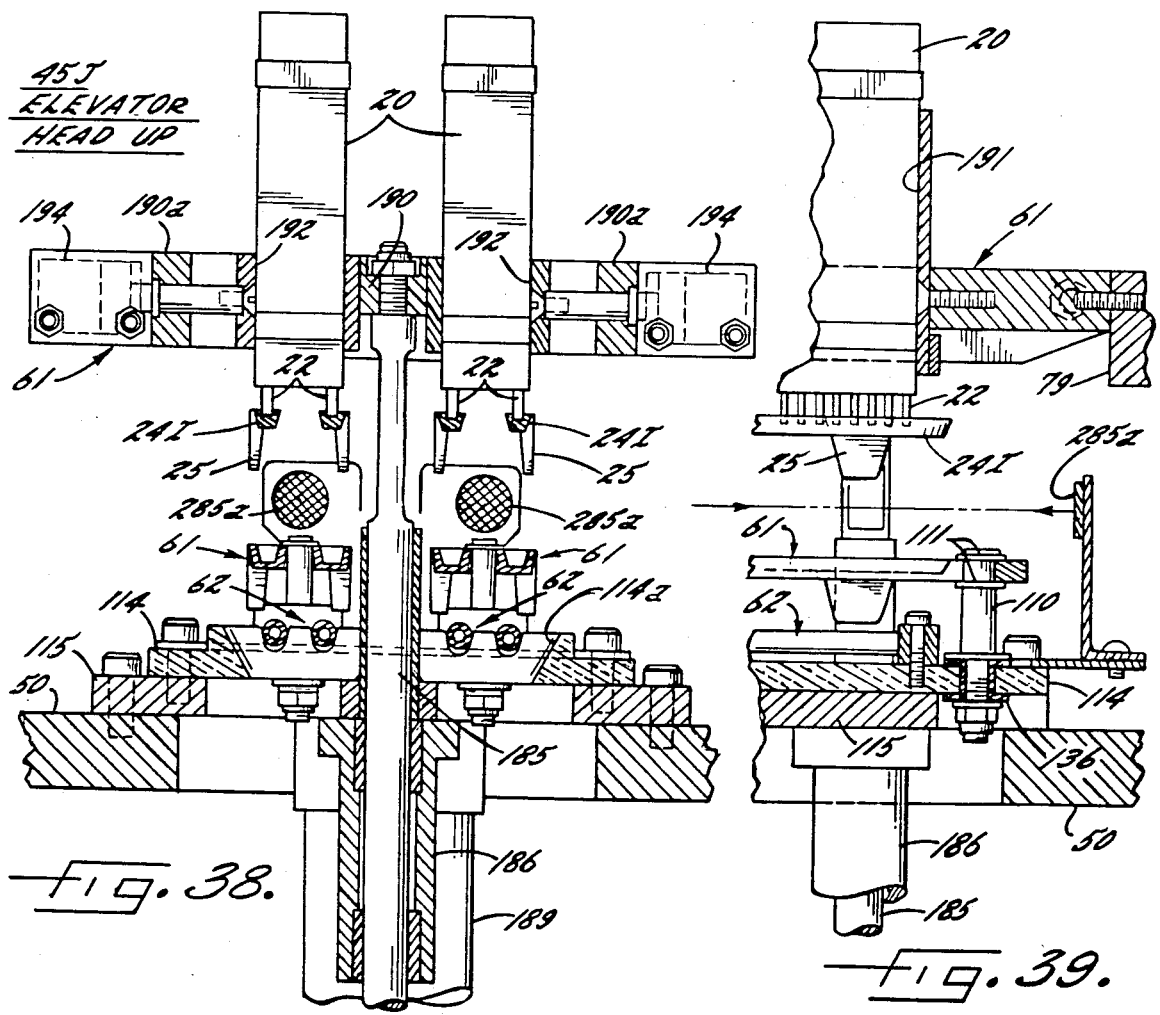

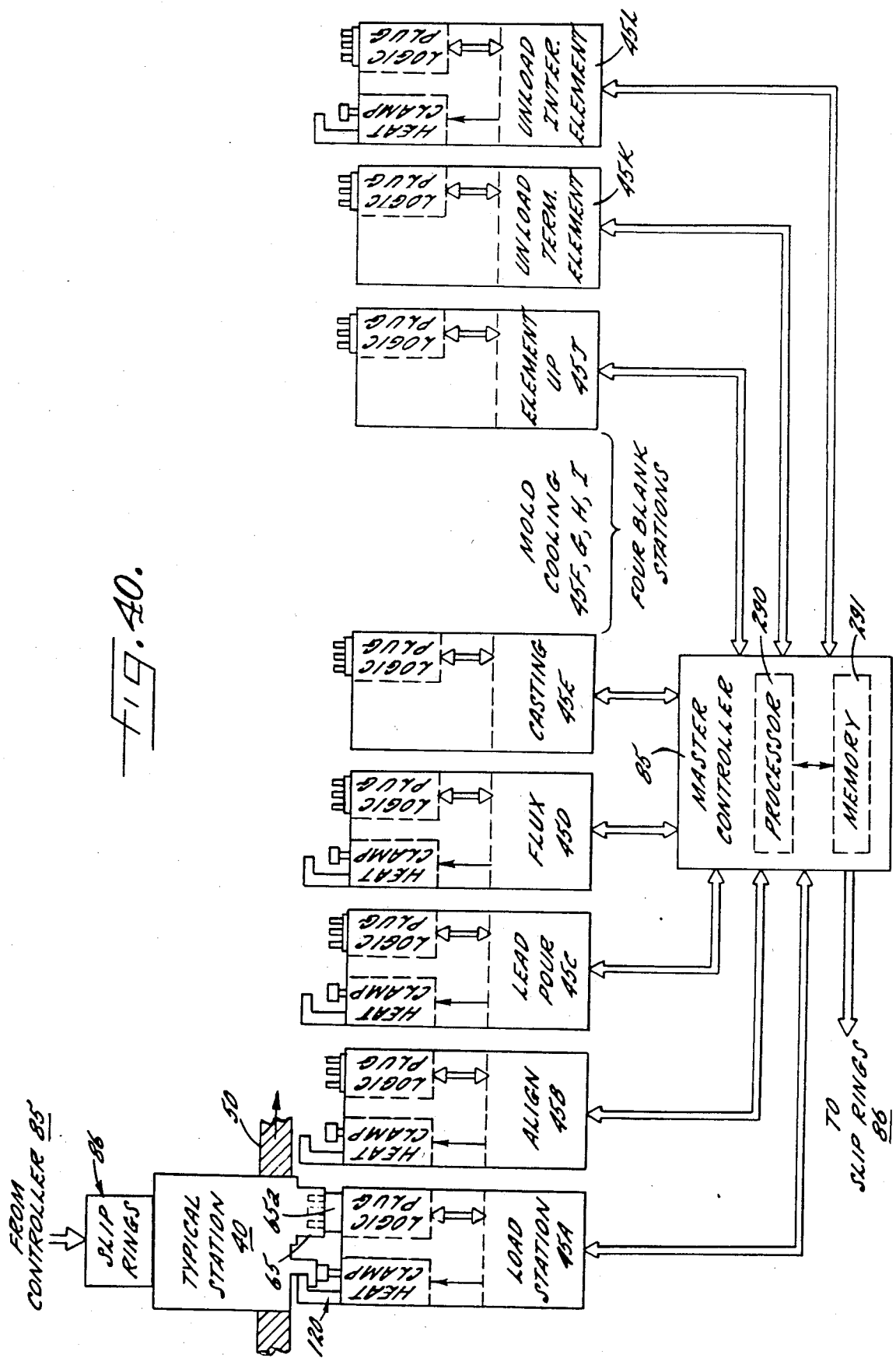

ELECTRICALLY HEATABLE MOLD AND METHOD OF CASTING METAL STRAPS

RELATED APPLICATIONS

Klang and Rao, U.S. Ser. No. 352,924, filed Feb. 26, 1982, now abandoned for: Lead-Acid Battery and Method of Making Same; a continuation-in-part of U.S. Ser. No. 245,772, filed Mar. 20, 1981, abandoned.

Schaumburg, et al., U.S. Ser. No. 380,785, filed May 21, 1982, now U.S. Pat. No. 4,534,401, for: Apparatus and Method for Casting Straps on Battery Cell Elements.

BACKGROUND OF THE INVENTION

The present invention relates generally to lead-acid storage batteries, and more particularly, to a method and apparatus for casting straps onto the plate lugs of battery cell elements.

Heretofore, it has been the practice to assemble battery cell elements comprising a plurality of lead grids coated or filled with suitable paste and grouped as alternative positive and negative plates separated by interleaved electrical insulating separators and then to secure and electrically couple the assembly of plates by casting straps of a lead or lead alloy onto respective groups of lugs for the positive and negative plates. While different approaches have been proposed for casting such lug straps, they have suffered from various drawbacks, including inefficient and slow operation and difficulties in controlling casting conditions.

Problems have been incurred, for example, in controlling the temperature of the mold and molten lead for optimum and efficient casting. In processes where hot molten lead is introduced into an unpreheated, relatively cool mold, although cooling of the molten lead is expedited, the timing in which the element lugs must be placed into the rapidly cooling molten lead is critical, and a delay of only a fraction of a second can affect the quality of the casting. To minimize such timing problems, others have proposed preheating the mold to substantially the temperature of the molten lead by passing heated fluids through passageways in the mold, or by incorporating electrical heating elements in the mold. Such approaches, however, increase the mass of the mold, which in turn makes heating and cooling of the mold inherently slower, less efficient, and more difficult to precisely control. When efforts have been made to externally preheat the mold, such as by a gas flame or torch, the gas flow creates significant noise problems and heating is grossly inefficient.

Still further, many of the prior approaches for casting straps lack adequate temperature control to insure that uniform fused bonds between the straps being formed and the plate lugs are achieved. This can create a situation in which some of the bonds may be satisfactory while other bonds are unsatisfactory. Should some of the bonds rupture in service, the electrical performance of the battery would, of course, be adversely affected.

As may be appreciated, the assembly of lead-acid batteries may require the transporting of molten lead or lead alloys for various purposes. One prior process has thus utilized pipe made of stainless steel and other metallic materials for transporting molten lead or lead alloys in a system where the material being transported is retained in the molten state by the resistance heating of the pipe. This approach has been used, for example, for transporting lead or lead alloys from a lead pot to a pouring ladle used to cast straps.

It is an object of the present invention to provide a method for more efficiently casting lug straps onto lead-acid battery cell elements.

Another object is to provide such a method and apparatus which ensures optimum casting conditions in the mold and molten lead at the time of casting.

A related and more specific object is to provide a method of the foregoing type which permits relatively precise control of the temperature of the mold and molten lead on a continuous basis, and which eliminates the necessity for critical timing in the casting operation following mold filling.

Yet another object of the present invention is to provide a method of the foregoing type in which relatively uniform fused bonds may be achieved.

Other objects and advantages of the invention will become apparent upon reading the following detailed description and upon reference to the drawings, in which the present invention is utilized in the method and apparatus shown and described in the Schaumberg et al. application identified herein:

BRIEF DESCRIPTION OF THE DRAWINGS

FIG. 1 is a perspective of a lead acid storage battery having cell elements with cast-on straps of the type formed by the method of the present invention;

FIG. 2 is an enlarged perspective of one of the cell elements used in the battery illustrated in FIG. 1, prior to the casting of straps on the lugs thereof;

FIG. 3 is a partially diagrammatic top plan view of an illustrative apparatus incorporating the present invention;

FIG. 7 is an enlarged vertical section of the illustrated machine taken in the plane of 7—7 in FIG. 3;

FIG. 8 is an enlarged vertical section taken in the plane of line 8—8 in FIG. 3, showing disconnectable logic means for coupling the master controller of the apparatus to a mold and element carrying station of the rotatable carousel at one operating station, with an operating station logic connector shown in solid lines in a lowered disconnected condition and in phantom lines in a raised connected condition;

FIG. 9 is a vertical section taken in the plane of line 9—9 in FIG. 8;

In FIG. 10 is a horizontal section taken in the plane of line 10—10 in FIG. 8;

FIG. 11 is an enlarged fragmentary vertical section showing one of the spring-loaded logic pins of the logic coupling shown in FIGS. 8-10;

FIG. 12 is an enlarged side elevational view of the element loading station of the illustrated apparatus taken in the plane of line 12—12 in FIG. 3;

FIG. 16 is an enlarged vertical section taken in the plane of line 16—16 in FIG. 12;

FIG. 17 is a vertical section taken in the plane of line 17—17 in FIG. 16, showing a carousel station mold engaged by an operating station electrical contact clamps for pre-heating the mold;

FIG. 18 is a side elevational view of the loading station element transfer mechanism with the transfer arm thereof extended positioning cell elements into a carousel station;

FIG. 19 is a horizontal section taken in the plane of line 19—19 in FIG. 18;

FIG. 20 is a horizontal section taken in the plane of line 20—20 in FIG. 18, showing the loading station element transfer mechanism in a retracted condition after having loaded elements into a carousel station;

FIG. 22 is an enlarged vertical section of the element alignment station of the illustrated apparatus taken in the plane of line 22—22 in FIG. 3;

FIG. 24 is an enlarged top view of the lug-alignment element device, taken in the plane of line 24—24 in FIG. 22;

FIG. 30 is an enlarged vertical section of the fluxing station of the illustrative machine taken in the plane of line 30—30 in FIG. 3;

FIG. 30a is a vertical section, similar to FIG. 30, but showing the fluxing device an an advanced operative position with the flux trays thereof below cell elements carried by a carousel station;

FIG. 31 is an enlarged top view of the fluxing device taken in the plane of line 31—31 in FIG. 30;

FIG. 32 is an enlarged vertical section taken in the plane of line 32—32 in FIG. 30a;

FIG. 33 is an enlarged vertical section of the casting station of the illustrated machine, taken in the plane of line 33—33 in FIG. 3;

FIG. 34 is an enlarged vertical section taken in the plane of line 34—34 in FIG. 33;

FIGS. 35 and 36 are enlarged fragmentary sections showing the lugs of cell elements immersed in the molten lead during the casting operation and the subsequent cooling operation;

FIG. 37 is an enlarged horizontal section taken in the plane of line 37—37 in FIG. 33;

FIG. 38 is an enlarged vertical section taken in the plane of line 38—38 in FIG. 3 showing the elevator head-up station of the illustrated apparatus with the cell elements removed from the molds after lug straps have been cast thereon;

FIG. 39 is a partial section taken in the plane of line 39—39 in FIG. 37;

FIG. 40 is a schematic of the master controller of the apparatus showing its coordination with a typical carousel station and the plurality of operating stations.

SUMMARY OF THE INVENTION

Figure 4:
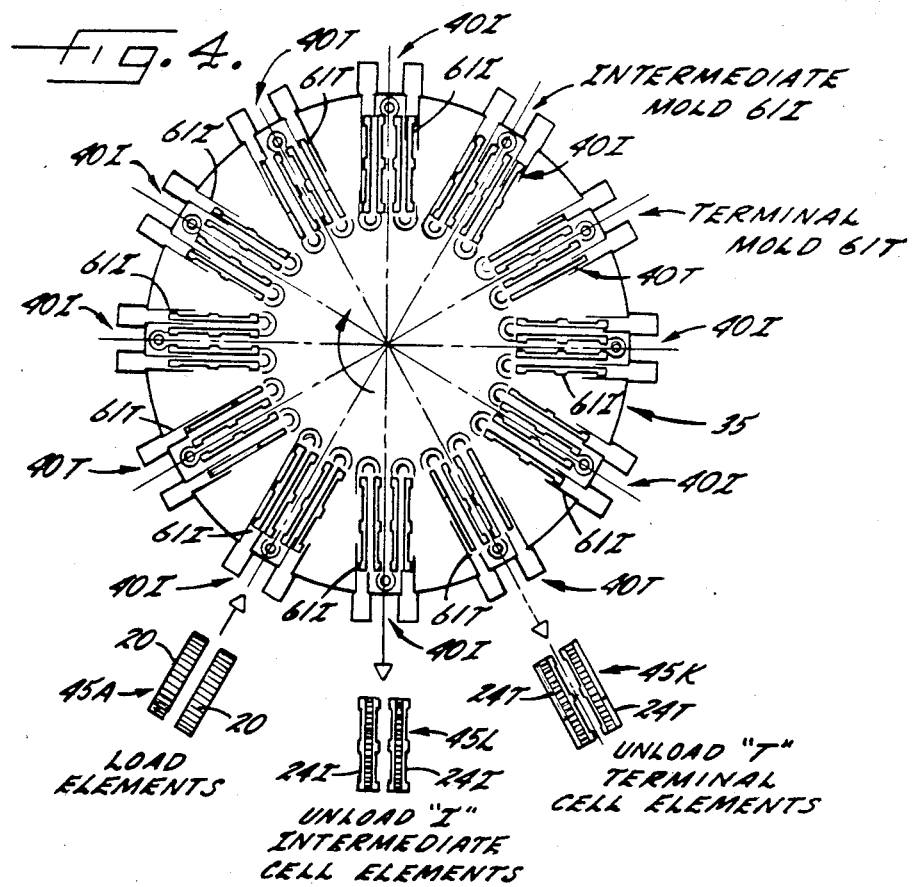
FIG. 4 is a diagrammatic top plan view of the multiple station mold and cell element carrying carousel included in the apparatus shown in FIG. 3, showing a single element loading station and separate unloading stations for elements with cast-on straps for use in terminal and intermediate battery cells.
Figure 5:
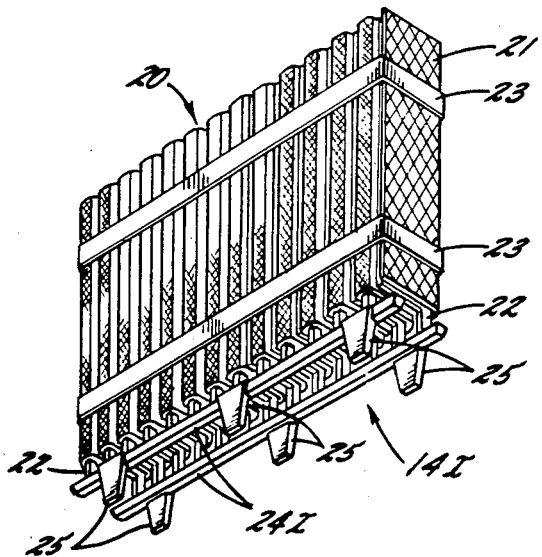
FIG. 5 is an enlarged perspective of an intermediate battery cell with straps cast thereon by the illustrated apparatus.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the invention is to cover all modifications, alternative constructions and equivalents falling within the spirit and scope of the invention. Thus, for example, while the present invention will be illustrated in conjunction with the method and apparatus shown in the Schaumberg et al. application identified herein, the invention is not so limited. The method and the mold of this invention may be employed in conjunction with any other apparatus desired. Further, while the battery illustrated is one embodiment of the type described in the Klang et al. application identified herein, it should be appreciated that the present invention may be utilized to cast a strap on the lugs of any type of battery.

In general, the present invention is predicated on the discovery that the casting of straps onto the lugs of battery plates can be greatly facilitated by utilizing appropriate resistance heating of the mold in which the strap is being cast. Selection of the appropriate conditions allows a method of casting straps which can obviate the problems of prior techniques previously discussed. The fused bonds formed between the strap and the lugs should be assured to be of more than satisfactory quality, yet the overall casting operation should be considerably less critical than in prior techniques.

DETAILED DESCRIPTION OF THE INVENTION

Referring to FIG. 1, there is shown an illustrative completed battery 10 having cell elements with lug straps of the type cast in accordance with the present invention. The illustrated battery 10, which is of a type generally similar to that shown in the pending Klang et al. application identified herein includes a case 11 formed with a plurality of internal divider partitions 12 which form individual compartments for containing respective battery cells 14I or 14T. The illustrated battery 10 includes six cells, namely two outermost terminal cells 14T at opposed ends of the battery and four intermediate cells 14I located therebetween.

Each battery cell 14I, 14T includes a cell element 20, illustrated in FIG. 2, which comprises a plurality of positive and negative electrode plates arranged in alternate relation and with adjacent plates being separated by a serpentinely folded insulator sheet 21. Each plate has an integrally formed lug 22 located at a upper corner thereof, and the lugs 22 of like polarity plates are aligned along one side of the element 20 and the lugs 22 of plates of opposite polarity are aligned on the opposite side of the element 20. The plates of the illustrated battery cell element 20 have a height substantially greater than their width and are stacked in a row such that the long dimension of the element is transverse to the plane of the individual plates. For retaining the plates of each cell element 20 in a composite package during handling, strips 23 of tape surround the cell element.

In order to electrically couple the plates of like polarity of each cell element 20, the rows of plate lugs 22 each are joined by a respective cast lead strap 24I or 24T. The rows of plate lugs 22 adjacent the internal divider partitions 12 in the present instance each are joined by a strap 24I formed with a plurality of upstanding tabs or tombstones 25 which are disposed adjacent appropriate apertures in the respective partition 12. Such straps 24I are provided on both rows of lugs of the elements in the intermediate cells 14I and on the row of lugs of each element in the terminal cells 14T adjacent a partition 12. As is known in the art, elements in battery cells 14I, 14T can be electrically connected in series by appropriate intercell connections of adjacent tombstones 25 through the respective apertured partitions 12.

Figure 6:
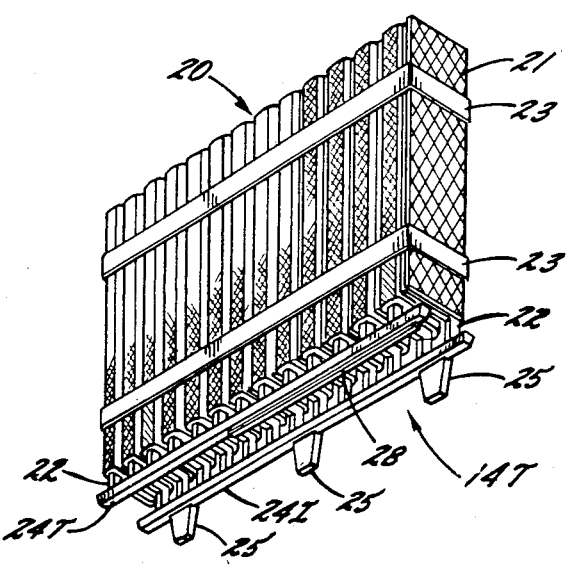
FIG. 6 is an enlarged perspective of a terminal battery cell with straps cast thereon by the illustrated apparatus.

The outermost row of lugs on elements in each terminal cell 14T, on the other hand, has a strap 24T upon which a terminal post 26 is mounted. It will be understood that such terminal post strap 24T may be integrally formed with a terminal post 26, or alternatively, the post may be separately mounted or cast on the strap. In the illustrated apparatus, the terminal post straps 24T are cast with an upstanding ledge 28, as illustrated in FIG. 6, upon which a terminal post may be subsequently cast.

Referring now to the remaining figures, and particularly FIGS. 3 and 4, there is shown an illustrative apparatus 30 including the casting system of the present invention. Pairs of battery cell elements 20 are continuously delivered along a single delivery conveyor 31 to a multiple station mold and element carrying carousel 35, casting straps 24I on cell elements 20 carried at some of the carousel stations for intermediate battery cells 14I and straps 24I and 24T on cell elements 20 carried at other of the carousel stations for terminal battery cells 14T. Thereafter, the completed elements for terminal cells 14T are transferred to one discharge conveyor 36 and the completed elements for intermediate cells 14I to a second discharge conveyor 38. The illustrative carousel 35 includes twelve substantially similar mold and element carrying stations 40 (also more specifically designated 40I or 40T) with every third station 40T, or terminal cell element station, having a mold for casting one tombstone strap 24I and one terminal post receiving strap 24T on each element carried at such station and the two succeeding stations 40I, or intermediate cell element station, each having molds for casting pairs of tombstone straps 24I on the battery cell elements 20 carried at such stations. As will become apparent, the illustrated carousel 35 is adapted to simultaneously process battery cell elements for four six-cell, lead-acid batteries, with every third carousel station 40T casting straps on elements for two terminal cells 14T and the two succeeding stations 40I casting straps on elements for four intermediate battery cells 14I.

The carousel is adapted to successively and continuously index the mold and element carrying stations through a succession of precisely controlled operating stations to cast the lug straps under optimum conditions and on an efficient and uninterrupted basis. In the illustrated apparatus, as depicted in FIG. 3, the carousel 35 indexes each carousel station 40 successively through twelve operating stations 45 (also more specifically designated 45A–45L) including (1) a loading station 45A where a pair of cell elements 20 are transferred from the delivery conveyor 31 into a carousel station 40, (2) an alignment station 45B where the rows of lugs 22 of elements carried in the carousel station are more precisely aligned, (3) a lead-pour station 45C where the mold carried in the carousel station is filled with molten lead, (4) a fluxing station 45D where flux is applied to the element lugs 22, (5) a casting station 45E where the element lugs are immersed in molten lead contained in the carousel station mold, (6) cooling stations 45F, 45G, 45H, 45I where the molten lead in the mold is cooled and solidified, (7) an elevator head-up station 45J which verifies that the molds have been cooled to a predetermined temperature and lifts elements from the mold, (8) a terminal-cell element unloading station 45K where terminal-cell elements with straps 24T, 24I cast thereon are transferred from a terminal-cell element carousel station 40T to the first discharge conveyor 36, and (9) an intermediate-cell element unloading station 45L where intermediate-cell elements with straps 24I cast thereon are transferred from an intermediate cell element carousel station 40I to the second discharge conveyor 38. The empty carousel station 40 is thereupon again indexed to the loading station 45A for receiving another pair of cell elements 20 for repeat of the casting cycle.

The illustrated carousel 35, as best shown in FIG. 7, includes a rotary table 50 mounted on a rotary indexer 51, which in turn is mounted on an elevated base plate 52 of the apparatus frame 54. The carousel table 50 has a centrally disposed upstanding frame 55 and carries the plurality of carousel stations 40 at circumferentially spaced locations about its outer periphery. The indexer 51 may be of a known type, which upon energization can selectively rotate the table 50 and the carousel stations 40 carried thereby to the successive operating stations 45. Since there are twelve evenly spaced operating stations 45 in the illustrated apparatus, the indexer 51 in this case indexes the carousel incrementally 30° between successive stations. For sensing the rotative position of the carousel 35, the indexer 51 has an output shaft 56 carrying a cam 58 which engages a suitable limit switch 59.

Each of the carousel stations 40 is substantially similar, including an element holding elevator head 60 for receiving and carrying pairs of battery cell elements 20, a mold 61 (also more specifically designated 61I or 61T) arranged below the elevator head 60 for simultaneous casting lug straps on both cell elements 20 carried at such carousel station, mold cooling means including an air-discharge tube assembly 62 disposed in close proximity to the mold 61, a station control panel 64 mounted on the upstanding carousel frame 55, and disconnectable control coupling means including a logic connector 65 for coupling the carousel station 40 to a master controller for the apparatus through an operating station at which it is located. The carousel stations 40T and 40I differ in mold cavity configuration, as indicated above, depending upon whether the carousel station is to cast straps on elements for terminal or intermediate cells 14T or 14I.

For supplying air to the respective carousel stations 40 on the rotary table, an air supply line 66 on the underside of the frame plate 52 is connected through a rotary union 68 to a T-shaped air supply line 69 carried for rotation with the table 50. The supply line 69 has one outlet of the T fitting coupled through a pressure regulator 60 to a mold-cooling air supply manifold 71, which in turn is connected through lines 74 with a respective cooling-air, solenoid-actuated, control valve SOL-1 for each carousel station 40. The other outlet end of the T fitting of air supply line 69 is connected through a line 75 to another T fitting 76, one end of which is coupled through a pressure regulator 78 to a series of elevator-head clamping, solenoid-actuated control valves SOL-3 for the respective carousel stations 40, which in turn are respectively connected through lines 80 to an elevator head-clamping air manifold 79 for each station. The other end of the T fitting 76 is connected through a pressure regulator 81 to a series of double actuating, solenoid-actuated control valves, designated SOL-2a, SOL-2b, for controlling the raising and lowering of the respective carousel station elevator heads 60, as will be as described later.

For coupling the carousel 35 to a master controller 85 for the apparatus and for supplying electrical power to the carousel, a slip ring assembly 86 is mounted at the upper end of the carousel frame 55. The slip ring assembly 86 is contained within a housing 87 fixed to the top of the carousel frame 55 and has a stator 86a supported by bearings 88, 89 that permit relative rotational movement of the carousel. The slip ring assembly 86 has a plurality of pick-up leads 86b mounted within the housing 87 which are electrically coupled to the respective carousel stations 40.

To permit further selective coupling of the individual carousel stations 40 to a master controller 85 of the machine while located at an operating station, each carousel station logic connector 65 is supported in depending fashion from the underside of the rotary table 50 and is selectively engageable by a respective operating station logic connector 65a, as shown in FIGS. 8-11. Each carousel station logic connector 65 in this instance has a plurality of male logic pins 90 which are adapted to engage a corresponding number of spring biased female logic pins 90a carried in an operating station logic connector 65a.

For selectively engaging the logic connectors 65, 65a, upon indexing of a carousel station 40 to an operating station 45, each operating station logic connector 65a is mounted in a bracket 91 which in turn is supported for vertical movement on an upstanding guide rod 92 mounted on the frame plate 52. The mounting bracket 91 has a flange 94 secured to the upstanding end of a rod 95a of a pneumatic cylinder 95, which upon actuation, raises the logic connector 65a into operative engagement with the connector 65 of a carousel station.

To facilitate reliable engagement of the logic connectors, the carousel logic connector 65 is mounted in a plate 96 which in turn is mounted on the underside of the rotary table 50 for transverse floating movement. The plate 96 has a pair of depending locator pins 98 with tapered lower ends for engaging tapered bushings 99 (FIG. 8) carried by the operating station logic bracket 91 for guiding the logic connector 65 on its floating mounting plate 96 into proper alignment. A limit switch 100 is provided for sensing the raised or lowered condition of the operating station logic connector 65a.

It will be appreciated that operating station logic connectors 65a can be provided at each operating station 45 where it is desired to control or monitor the operation of a carousel station through the master controller 85 of the apparatus, as will become apparent. In the illustrated apparatus, operating station logic connectors 65a are provided at each operating station 45, except the four cooling stations 45F–45I.

Figure 29:
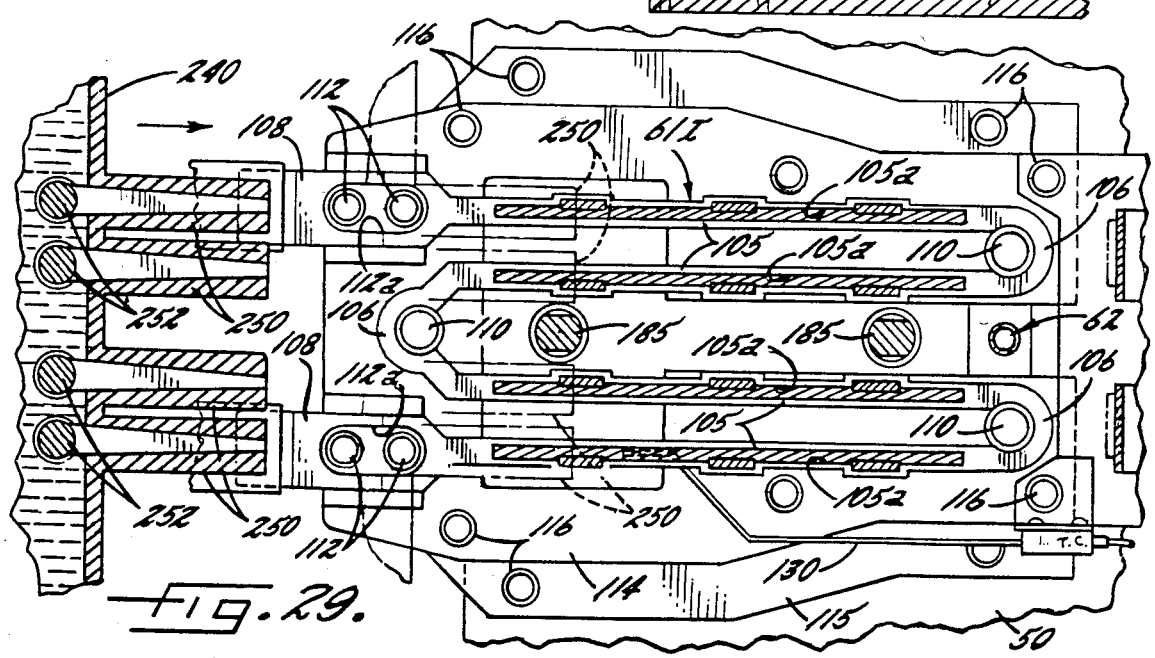
FIG. 29 is an enlarged horizontal section taken in the plane of line 29—29 in FIG. 28a and showing the ladle being advanced to its lead-pour position.

In accordance with the present invention, the mold for each carousel station is adapted for relatively quick and precisely controlled heating and cooling by conducting electrical current in series through a plurality of mold cavity sections of each mold. As shown in FIGS. 12 and 29, the illustrated molds 61I, 61T each has a one-piece serpentine configuration that includes four elongated sections 105 which each define a mold cavity 105a for one of the lug straps to be cast. The elongated sections 105 are disposed in parallel transversely spaced relation and are integrally connected by arcuate end mounting portions 106. The two outermost mold sections 105 terminate in a pair of terminal flanges 108 extending outwardly of the periphery of the carousel table 50. The design of the mold cavities 105a, as previously indicated, is dependent upon whether the carousel station 40 at which it is carried is to cast straps on elements for terminal or intermediate battery cells 14I or 14T (FIG. 4). Intermediate cell element carousel stations 40I have molds 61I with cavities designed to cast only tombstone straps 24I on the cell elements carried thereby, while terminal-cell element carousel stations 40T have molds 61T with cavities for casting or molding one tombstone strap 24I and one terminal post receiving strap 24T on each cell element 20.

Each mold 61I, 61T is mounted on upstanding posts 110 with the elongated cavity-containing sections 105a in elevated position. To permit horizontal expansion and contraction of the mold sections 105, the mold is mounted on the posts 110 between the elongated sections 105 and is carried between snap rings 111 (FIG. 39). The terminal flanges 108 of the mold are secured by bolts 112 with the heads thereof recessed in elongated counterbores 112a in the flanges (FIG. 29). To permit quick change or replacement of the mold 61, the mold mounting posts 110 and bolts 112 are secured in a mold mounting plate 114, which in turn is secured to a base plate 115 by bolts 116, which in turn is carried by the carousel table 50. Removal of the mold mounting plate bolts 116 thereby enables easy replacement of the mold 61 and mounting plate 114 assembly.

In keeping with the invention, each mold has a lightweight construction and is adapted for quick electrical resistance heating and rapid cooling, preferably forced air-cooling, during the successive casting operations. The molds 61 each preferably are made of stainless steel having an electrical resistivity sufficient to create the desired heating upon coupling of the terminal flanges 108 of each mold to an appropriate electrical source and the resultant conduction of current in series through the plurality of elongated sections of each mold. Type 303 (industry standard) stainless steel has been found to be quite suitable for the molds and has an electrical resistivity at 68° F. of 73 microohm-cm and at 720° F. of 96 microohm-cm. Other stainless steels in the 300 and 400 series also have acceptable resistivity and will be satisfactory for making the molds. It may be desirable to avoid carrying out the casting operation in relatively close proximity to components made of sufficiently magnetic materials such that inductive currents or the like may be developed which could result in less uniform and predictable heating than desired.

As is knonw, the material used to cast the strap will depend upon the alloy or other material used for the battery plate grids. Lead or many of the known lead alloys may be employed. Indeed, other non-ferrous metals and other materials may also be cast in accordance with this invention by selecting the appropriate time and electrical current to achieve the desired heating.

With regard to the configuration of the elongated molds 61, it is desirable to configure the mold such that the electrical resistance heating which is provided can be effected quickly and efficiently with minimal heat losses. Further, it is desirable to configure the cavity containing sections 105 so that relatively uniform fused bonds are provided and the cast strap can be quickly and efficiently cooled. Thus, the corners of the mold as well as other areas remote from the cavity containing sections 105 may be somewhat thicker than what can be termed the working area of the mold so that the heat developed by the electrical resistance heating of the mold is principally directed to the strap being cast. The walls of the mold adjacent the cavity containing sections 105 should accordingly be as thin as possible to enhance the heating and cooling. In general, this will involve providing relatively uniform mold cross-section areas. The satisfactory nature of the resulting fused bonds between the strap and the lugs can be readily determined by, for example, microscopically examining the fused bonds. In a particular situation, any hot spots (areas where too much heat results) can be obviated by thickening the mold in those areas. Similarly, any cold spots (areas where insufficient heating is provided for the desired fused bonds) can be obviated by suitable thinning of the mold in such areas.

It has been found that utilizing electrical resistance heating provides a method of casting the strap which can be effected quickly with minimal heat losses and is susceptible to relatively precise temperature control. The resulting fused bonds should be of relatively high quality, even in applications requiring quite uniform bonds.

For selectively coupling of the terminal mold flanges 108 to an electrical source remote from the turntable 52 for mold heating purposes, electrical contact-clamps 120, shown in FIGS. 16 and 17, are mounted at selected of the operating stations 45 where mold heating is desired. Upon indexing of the carousel station 40 to such operating station, the clamps 120 can be brought into engagement with the outwardly extending terminal mold flanges 108. The clamps 120 for each operating station includes a pair of contact-clamp heads 121 mounted at the upper end of respective upstanding support rods 122 carried by the frame plate 52 at the operating station. As shown in FIG. 17, each clamp head 121 has a mold flange-contacting jaw 121a and a lower spaced flange 121b carrying single actuating spring return air cylinder 124. The air cylinder 124 has a cylinder rod 124a extending into the space between the jaw 121a and flange 121b such that, upon actuation of the cylinder 124, the mold flange 108 is engaged between the clamp jaw 121a and end of the cylinder rod 124a.

The clamps 120 in this case each have a floating mounting on the support rods 122 to facilitate positioning of the mold flanges into the clamp upon carousel indexing. To this end, the clamp heads 121 are mounted for relative movement on the support rods 122 on springs 125 interposed between the underside of the clamp heads 121 and the top side of a fixed bracket 126 mounted to each of the support rods 122. With the cylinders 124 in retracted or clamp-open condition, as shown in FIG. 12, the clamp heads 121 rest on the springs 125 in an opened uppermost position so as to permit terminal flanges 108 of a mold carried at a carousel station to be easily moved into the clamp. With the mold flanges 108 so positioned, actuation of the cylinder 124 will cause the cylinder rod 124a (FIG. 17) thereof to move into engagement with the underside of the mold flanges 108, such that further extension of the rod 124a in closing the clamp will draw the clamp heads 121 downwardly on their support rods against the biasing force of the springs 125. When the carousel station is again to be indexed, the spring return cylinders 124 are de-energized to retract the rods 124a, allowing the clamp heads to return to their raised opened position.

The heads 121 of the electrical contact clamps 120 can be coupled to a suitable electrical source at operating stations where the clamps are located and mold heating is required. The molds 61 preferably are heated by passing of the required electrical current to the molds through such contact-clamps 120 at successive of the operating stations, prior to lead pouring, until they are brought to a suitable preheated temperature, which should be in excess of the melting point of molten lead to be introduced into the mold, sufficiently high to activate the type of flux to be applied to the element lugs prior to casting, but below a temperature which would cause any substantial melting of the element lugs during fusion.

To this end, it has been found satisfactory to maintain the temperature of the working area of the mold at essentially the temperature of the lead or other material being cast. As may be appreciated, too great a temperature differential between the material being cast and the mold temperature could result in unsatisfactory bonds, for example, due to premature solidification, less than a desirable casting temperature for portions of the strap, or the like. In the illustrative embodiment, it has been found satisfactory to at least maintain the temperature of the working area of the mold at 720° F.±50° F., more preferably, at least 720° F.±30° F. What is considered important is that the temperature of the molten strap material in which the lugs are immersed be relatively uniform and be maintained at the temperature desired for fusion with the lugs. Providing the requisite fused bonds does not require that any portions of the lugs be also in a molten condition. However, as a practical matter, it has been found that the tips of the lugs will occassionally melt somewhat during the casting. This should not detract from the quality of the resulting fused bond.

In the illustrated embodiment, electrical contact-clamps 120 are located at the intermediate-cell element unloading station 45L, the loading station 45A, the alignment station 45B, the lead-pour station 45C, and the fluxing station 45D to permit mold heating at the successive stations prior to both mold filling and casting. It will be appreciated that, since the mold heating current can be supplied from a number of different operating stations remote from the carousel, adequate current can be provided for simultaneous heating of molds at a plurality of carousel stations without limitations otherwise imposed by directing such heating current to the carousel through the slip ring assembly 86. By virtue of the construction of the molds, the manner of heating, and the ability to heat the molds at successive operating stations, it is possible to maintain the molds of each table station at a desired preheated condition with relatively precise control.

For monitoring the temperature of each mold 61 at the various carousel stations 40, a thermocouple 130 is mounted in each mold 61 and is connected to a respective carousel station temperature-controller 131 (FIG. 29) having low and high temperature set-points. The high temperature set-point preferably should be the desired preheat temperature of the mold, or just slightly below such temperature, and the low set-point should be the desired temperature of the mold after cooling sufficiently to permit removal of the casting without damage thereto. For most accurate temperature monitoring, the thermocouple 130 preferably is connected to the body of the mold at a central location along an elongated mold section 105 and extends into the mold to a point in close proximity to the cavity wall.

A typical heating sequence of the above identified preheat stations is as follows. Each station is preheated for a period of 4½ seconds at a voltage of 11 volts and an initial current of 750 amps. This produces a temperature increase of approximately 50° F. per second. In continuous operation the normal mold temperature at the beginning of each cycle of operation is initially about 200° F. to 250° F., thus the desired high temperature set-point will normally be achieved early in the heating step at the third preheat, or alignment, station, thereby turning off the current flow to that station until the temperature controller senses a drop in temperature below the high set-point and the master controller reactivates the current flow. During any periods of interruption in the operations cycle, the preheat stations will continue their on-off heating cycle to maintain the mold temperature at the set-point once that temperature is obtained. Typically the molds are heated at the lead-pour station and the fluxing station to maintain the desired temperature by supplying an electrical voltage of 6 volts and a current of 400 amps. At the fluxing station, heating is continued for 4½ seconds, whereas the heating at the lead-pour station is limited to the time remaining after the completion of the lead-pour step and typically will be on the order of approximately ½ to 1 second. During periods of interruption of the operations cycle, the heating of these stations will continue in the same manner as for the above described preheat stations.

Because of the current flow through the molds during their heating, the clamps 120 and molds 61 are insulated from the portions of the apparatus upon which they are supported. The clamp heads 121 in this case are mounted on plastic sleeves 132 (FIGS. 16 and 17), a plastic cap 134 is carried at the end of the clamping cylinder rod 124a, and the cylinder rod 124a and cylinder 124 are suitably insulated from the lower clamp-head flange 121b by a sleeve and plate 135. The mold support posts 110 each also are insulated from the mounting plate by sleeves 136 (FIG. 39), and appropriate insulating sleeves and spacers, including spacers 138, 139, insulate the mold flanges 108 and mounting bolts 112 from the mounting plate 114 (FIG. 17).

Referring now specifically to the loading station of the apparatus, shown in FIGS. 3 and 12, the delivery conveyor 31 conveys cell elements 20 in their normal upright position, with the lugs 22 thereof on the top side, to a pick-up location at the end of the conveyor where a transfer mechanism 140 engages pairs of elements 20, inverts and transfers them in inverted position to the element holding elevator head 60 of a carousel station 40. The delivery conveyor 31, best shown in FIGS. 12 and 13, includes a pair of independently driven conveyor belts 141 adapted to move two transversely spaced rows of elements 20 in the direction of the transfer mechanism. The conveyor belts 141 are driven from a single drive motor 142 through independent drive trains, each including a chain 144 driven by the drive motor 142 and belt drive shaft 145 carried in a bearing block 146 supported from the underside of a frame 148 of the conveyor. The upper horizontal portion of the conveyor belts 141, upon which the elements 20 ride, each are supported by appropriate belt guides 149. It can be seen that since the elements 20 are disposed in their normal upright position on the belts 141 they may be readily transported by the delivery conveyor with only guide blocks 150 mounted adjacent the upper portions of the elements.

Figure 13:
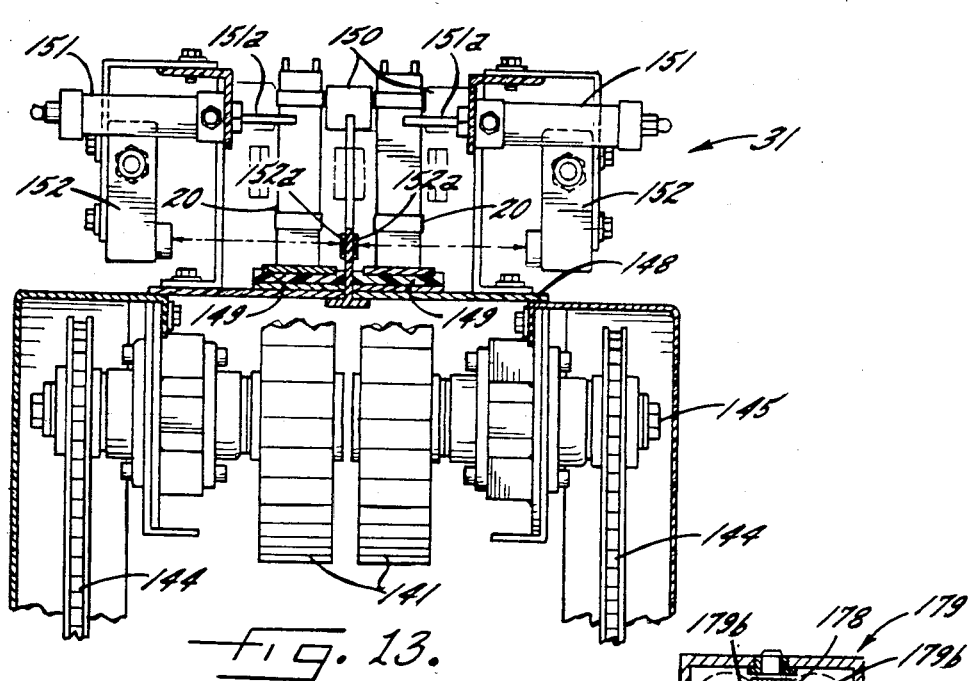
FIG. 13 is an enlarged vertical section of the element delivery conveyor at the loading station, taken in the plane of line 13—13 in FIG. 12.

To stop pairs of moving elements 20 at the pick-up location adjacent the delivery end of the conveyor 31, a pair of movable stop-pins are disposed at the ends of the respective belts 141. The stop-pins 151a are actuated by respective air cylinders 151 transversely supported by the conveyor frame 148 (FIG. 13). When a pair of elements reach the stop-pins 151a so as to be ready for pick-up by the transfer mechanism 140 (FIG. 14), the cylinders 151 may be actuated to withdraw the pins 151a. Upon removal of the elements 20 by the transfer mechanism, respective photocells 152 will detect light from associated reflector plates 152a, as illustrated in FIGS. 13 and 15, to generate a signal for again returning the stop-pins to their extended, or element stopping, positions.

The loading station transfer mechanism 140, best shown in FIGS. 12, 14, 15 and 18-21, includes an extensible and pivotable transfer arm 155 mounted on a support bracket 156 extending outwardly from the frame plate 52. The support bracket 156 in this case includes lower upstanding support channels 156a and an upper yoke 156b selectively positionable on the channels 156a. The yoke 156b is secured by bolts 158 at a selected position for establishing the desired elevation of the transfer arm 155.

The transfer arm 155 includes a pair of elongated guide rods 157 with a clamping head 158 mounted at an outermost end thereof adapted for engaging elements at the discharge end of the delivery conveyor. The clamping head 158 in this case comprises a pair of U-shaped clamp members 160 mounted for relative transverse sliding movement on a shaft 161 carried between flanges of a cross-bar bracket 162 fixed at the ends of the guide rods 157. The clamp members 160 each have an inner leg 160a, disposed in closely spaced adjacent relation to each other, and an outer leg 160b which carries a transversely movable clamping bar 164. For moving the clamp members 160, and thus the inner legs 160a thereof, to opposed outwardly directed element-engaging positions, a double-acting air cylinder 165 is interposed between rearwardly-extending flanges of the respective clamp members 160. To move the clamp bars 164 inwardly relative to their respective support legs 160b toward element-engaging positions, a pair of single-acting cylinders 166 are mounted on the outside of each clamp leg 160b with their cylinder rods extending through the clamp leg 160b and carrying the respective clamp bar 164. The clamp bars 164 each are biased toward their open, or element releasing, position by a spring 168 acting on a shaft coupled to the clamp bar and extending outwardly through the clamp leg 160b.

Figure 14:
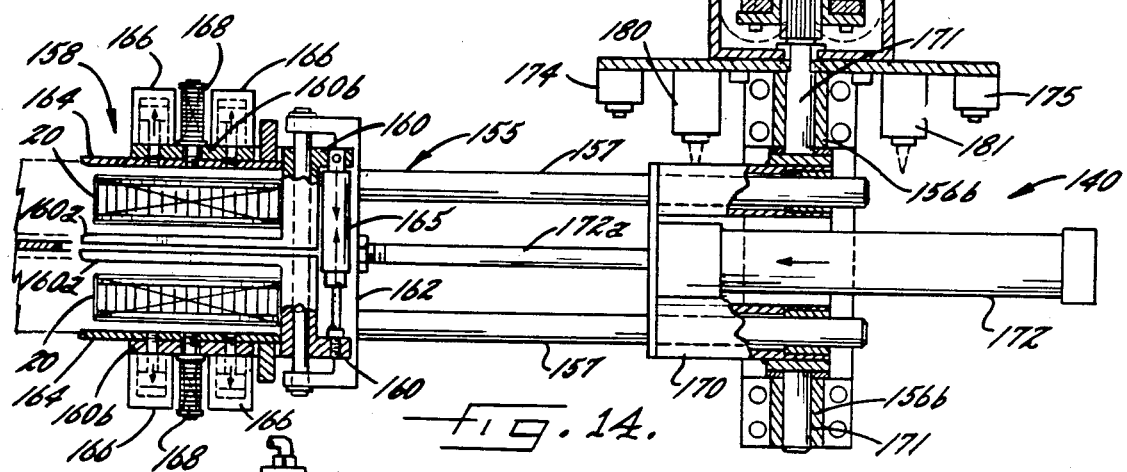
FIG. 14 is an enlarged horizontal section of the element transfer mechanism at the loading station taken in the plane of line 14—14 in FIG. 12, showing the transfer arm thereof in an extended condition for engaging cell elements on the delivery conveyor.
Figure 15:
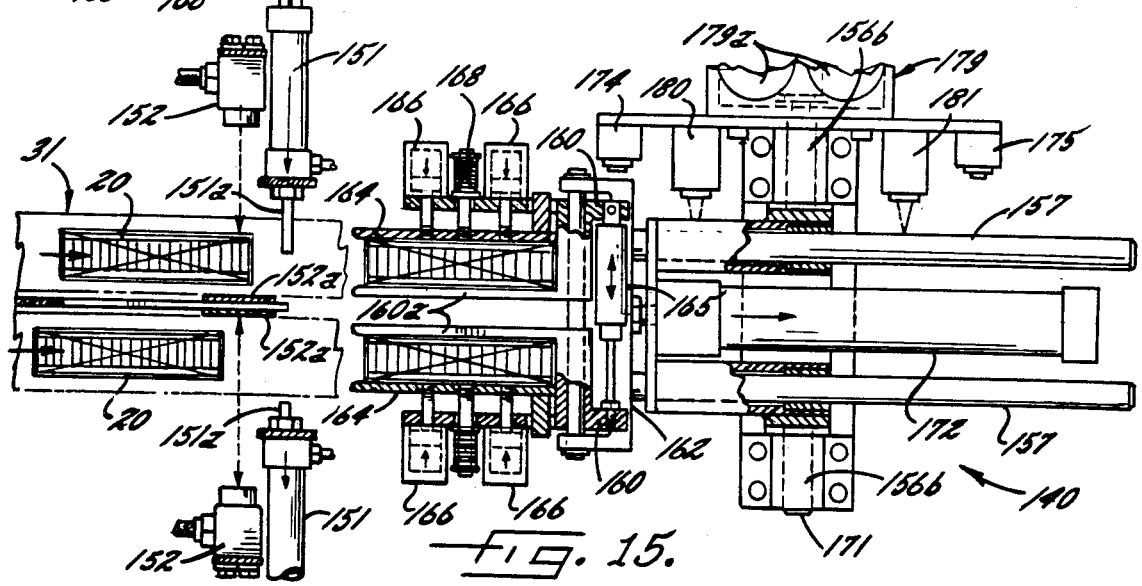
FIG. 15 is a horizontal section, similar to FIG. 14, showing the element transfer mechanism at the loading station with elements withdrawn from the delivery conveyor.

Actuation of the clamping-head cylinders 165 and 166, therefore, moves the clamp bars 164 and legs 160a from an open, or element-receiving position, such as shown in FIG. 14, to an element-engaging position, such as shown in FIG. 15. Deactivation of the clamp bar cylinders 166 and reverse actuation of the clamp member cylinder 165 will again return the clamp members of transfer-arm head 158 to an open, or element-receiving or releasing, condition.

For extending and retracting the transfer-arm 155, the transfer-arm guide rods 157 are mounted for relative sliding movement in a pivot bracket 170 which in turn carries a pair of outwardly extending support shafts 171 pivotably mounted in the support bracket yoke 156b. The pivot bracket 170 has centrally mounted thereon a double-acting air cylinder 172 having a cylinder rod 172a secured to the cross-bar 162 of the transfer-arm head 158 (FIG. 14). Actuation of the air cylinder 172 moves the transfer-arm 155 to an extended position enabling the clamping-head 158 to receive and engage elements 20 on the delivery conveyor 31, as shown in FIG. 14, and then be returned to a retracted position, as shown in FIG. 15. Magnetic switches 174, 175 are mounted on the support yoke 156b for sensing the retracted position of the transfer-arm head 158 on the respective delivery conveyor and carousel sides of the transfer mechanism. Converging light beam sensors 180, 181 also are provided for sensing the extended condition of the transfer-arm 155 on the respective carousel and delivery conveyor sides of the transfer mechanism.

To pivot the transfer-arm 155 from a position with the clamping head 158 on the delivery conveyor side of the transfer mechanism (FIG. 12) to a position where the clamping-head 158 is on the carousel station side of the transfer mechanism (FIG. 18), one of the pivot-bracket support shafts 171 carries a pinion 178 which can be selectively rotated by a rotary actuator 179 mounted on the support-bracket yoke 156b. The illustrated rotary actuator 179, which may be of a known air-oil tandem type, includes a pair of air cylinders 179a disposed on opposite sides of the pivot-bracket shaft 171, each cylinder 179a having an oppositely driven piston rack 179b engaging the pinion 178, as shown in FIG. 14, and FIGS. 21a–21e. By supplying air to the upper end of one cylinder 179a, the rack 179b of that cylinder is driven in a downward direction, forcing the rack of the adjacent cylinder upwardly, thereby rotating the drive pinion 178, the pivot-bracket 170, and the transfer-arm 155 carried therein. Actuating the opposite cylinder 179a of the rotary actuator 179 rotates the pinion 178 and transfer-arm 155 in the opposite direction.

Figures 21A, 21B, 21C, 21D, 21E:
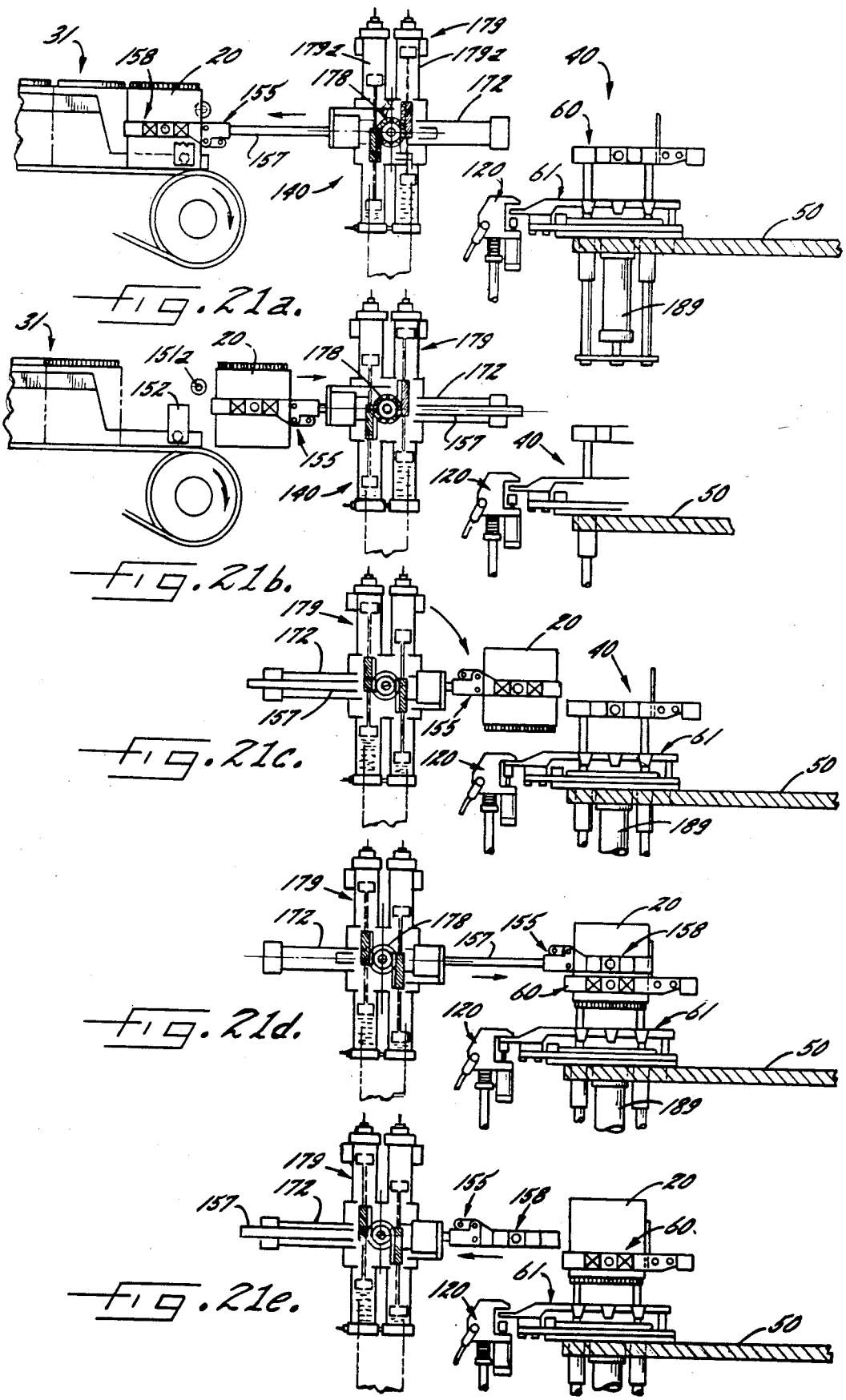
FIGS. 21a–21e is a diagrammatic sequential illustration of the operation of the element transfer mechanism at the loading station.

The sequential operation of the loading station transfer mechanism 140 is illustrated in FIGS. 21a–21e. Actuation of the cylinder 172 extends the transfer arm to move the clamping-head 158 into position for receiving a pair of elements 20 in their upright position at the end of the delivery conveyor 31 (FIG. 21a); the transfer-arm head 158 engages or clamps the elements by the actuation of cylinders 165, 166 and the transfer arm and the head are retracted by the actuation of cylinder 172, thereby removing or withdrawing the elements from the delivery conveyor (FIG. 21b); the transfer arm is pivoted by the actuation of the rotary actuator 179 to locate the elements on the carousel side of the transfer mechanism 140 in inverted position (FIG. 21c); the transfer-arm 155 again is extended to move the clamping-head 158 and the elements 20 carried thereby into a carousel station 40 for engagement of said elements by the elevator head 60 thereof, as will be described later (FIG. 21d); and the transfer-arm head 158 then releases the elements and is retracted, leaving the elements in the carousel station (FIG. 21e).

Each carousel station elevator head 60, shown in FIGS. 12 and 16, is mounted on upstanding support shafts 185 in elevated position above the carousel table 50 and is adapted to receive elements from the transfer mechanism and hold the elements as the carousel station is successively indexed through the operating stations. The elevator head support shafts 185 extend through the carousel table 50 between elongated sections 105 of the mold 61 and are supported for relative sliding movement in bearings 186 fixed to the underside of the carousel table base plate 115. The lowermost ends of the support shafts 185 are secured by a tie plate 188 mounted on the end of a piston rod 189a of a double-acting cylinder 189 secured in depending fashion from the underside of the base plate 115.

The elevator head 60 of each carousel station in this instance is formed with a central leg 190 and a pair of outwardly spaced legs 190a (FIG. 16) on each side thereof which defines a pair of element-receiving recesses 190b. An upstanding back plate 191 is mounted on the head 60 at the rear of each element-receiving recess for establishing a rear reference for elements 20 positioned therein. For selectively engaging elements positioned in the elevator head 60, a transversely movable clamping bar 192 is mounted on the inside of each of the outer legs 190a. The clamping bars 192 each are carried on the ends of rods 194a of single-acting cylinders 194 fixed to the outside of the respective legs 190a such that upon actuation of the cylinders 194 the clamping bars 192 are moved inwardly to an element clamping position (FIG. 20). Each of the clamping bars 192 are biased toward an outer or open position by a spring 195 which cooperates with a central clamp-bar shaft 196 extending outwardly through its supporting leg 190a. To permit selective actuation of the elevator head clamping cylinders 194, the clamping cylinders 194 are coupled to the air manifold 79 for the carousel station, which is connected by the line 80 to the respective solenoid, control valve SOL-3 for the carousel station.

Thus, when the clamping bars 192 of the carousel station elevator head 60 are in their open, or element-receiving position, the clamping head 158 of the transfer-arm 155 may be moved into the carousel station 60 to a position immediately above the elevator head 60, as shown in FIGS. 18 and 19, to position a pair of elements 20 in the elevator head 60 with their lower ends thereof extending below the elevator head. With the elements so positioned, the elevator head cylinders 194 may be actuated to cause the clamping bars 192 to engage the elements, at which time the transfer-arm head 158 can release the elements and be moved to a retracted position away from the carousel station, as indicated in FIG. 20.

As will become apparent, upon indexing of the carousel station 40 to the loading station 45A and prior to the transfer of elements 20 to carousel elevator head 60, the logic connector 65a of the transfer stations may be brought into engagement with the logic connector 65 of the carousel station for coupling the master controller 85 for the apparatus to the carousel station, and the electrical contact-clamps 120 for the transfer station 45A may be coupled to the terminal flanges 108 of the carousel station mold 61 for preheating the mold. Following loading of elements into the carousel station, the electrical contactor clamps 120 and logic connector 65a may be disengaged from the carousel station in the manner previously described, permitting the carousel station to be advanced to the alignment station 45B, where the electrical contact-clamps 120 and logic connector 65a of that station engage the carousel station.

The alignment station, shown in FIGS. 22-25, includes a lug-alignment mechanism 200 having a lug-aligning head 201 mounted on a carriage 202 for reciprocal movement to and from a carousel station 40. The lug-alignment head 201 has a frame 204 with a rear portion supported from the underside of the carriage 202 and two separate extensions 204a protruding forwardly of the carriage. The frame extensions 204a each have a pair of elongated lug-seating plates 204b upon which respective rows of lugs 22 of an element 20 are positionable. The carriage 202 in this instance has guide rods 205 on the underside thereof supported in linear bearing blocks 206 for relative translational movement. The bearing blocks 206 are mounted on a separate support bracket 208 extending outwardly of the apparatus frame plate 52.

For selectively moving the carriage 202 to and from a carousel station 60, a double-acting air cylinder 209 is carried by the support bracket 208 and has a rearwardly directed piston rod 209a secured to a depending bracket 210 fixed to the rear of the carriage 202. Retraction of the rod 209a through actuation of the cylinder 209 will move the carriage 202 from a retracted position, shown in FIG. 22, to an advanced position, shown in FIG. 23, with the lug-alignment head 201 disposed below the carousel station elevator head 60 and the elements 20 held therein. A limit switch 211 mounted on the carriage-support bracket 208 is actuated by forward and rearward carriage-locating stops 212, 214 for sensing the advanced and retracted position of the carriage 202.

In order to raise the lug-aligning head 201 from the position below the elements 20 at which it is located during advancement of the carriage 202 to an elevated position with the seating plates 204b thereof in relatively close proximity to the lugs 22 of elements 20 supported in the carousel elevator head 60, the aligning head 201 is mounted on guide posts 215 depending from the underside of the carriage for limited vertical movement with respect to the carriage. For raising the lug-aligning head 201 on the guide posts 215 an air cylinder 216 is mounted on the carriage 202 with its piston rod 216a extending downwardly through the carriage into engagement with the rear frame portion of the alignment head 201. Actuation of the air cylinder 216 will move the rod 216a in an upward direction raising the head 201 a distance established by adjustable stops 218 mounted in the carriage immediately above the head. A limit switch 219 actuated by a flange 220 secured to the rear of the head 201 senses the raised head position.

By carrying the lug-alignment head 201 in its lowered position in the foregoing manner when being moved by the carriage 202 into the carousel station it can be seen that there will be ample clearance for even significantly misaligned lugs 22 of elements 20 held in the carousel station. After positioning of the lug-alignment head 201 below the elements, the alignment-head 201 can be raised by actuation of the cylinder 216 to position the lug-seating plates 204b thereof in closer proximity to the element lugs 22.

With the lug-alignment head 201 in such raised position, the carousel station elevator head 60 may thereupon release the elements carried therein to allow them to drop onto and be supported on the lug-seating plates 204b, thereby establishing horizontal alignment of the lugs. To maintain the elements in an upright position upon their release by the elevator head 60, pairs of forwardly extending guide rods 225 are mounted in a bracket 226 which in this case is secured to the upper end of the cylinder 216. Each pair of guide rods 225 is disposed closely adjacent opposite sides of one of the elements 20 and are formed with outwardly flared forward ends 225a which permit the rods to be guided into proper position about the elements during their movement with the alignment-head 201 into the carousel station. In order to establish firm engagement of each element 20 against the respective elevator head rear reference plate 191, a pair of air cylinders 228 are mounted on the carriage 202 and have plunger rods 228a which, upon actuation of the cylinders 228, are extended to force the elements against the rear plates 191.

With the elements in the carousel station supported on the raised seating plates 204b of the alignment-head 201 and properly referenced against the rear plate 191, the alignment-head 201 is adapted to clamp and precisely align the element lugs 22. To this end, the frame extensions 204a of the alignment head each carry two clamp assemblies 230, 231 for transverse movement with respect to the respective seating plates 204b. The first clamp assembly 230 includes a pair of shafts 230a which are slidably supported in the alignment-head frame 204a and have ends extending outwardly thereof coupled by an extension tie bar 230b. A pair of clamps 230c are fixed in spaced relation on the opposite ends of the shafts 230a adjacent the inner sides of the respective seating plates 204b. The second clamp assembly 231 is supported for relative sliding movement on the shafts 230a of the first clamp assembly 230 and includes a pair of spaced clamps 231c which are disposed on outer sides of the respective seating plates 204b and tied together by a shaft 231a extending through the outermost of the two seating plates 204b of the frame extension 204a.

Figure 26:
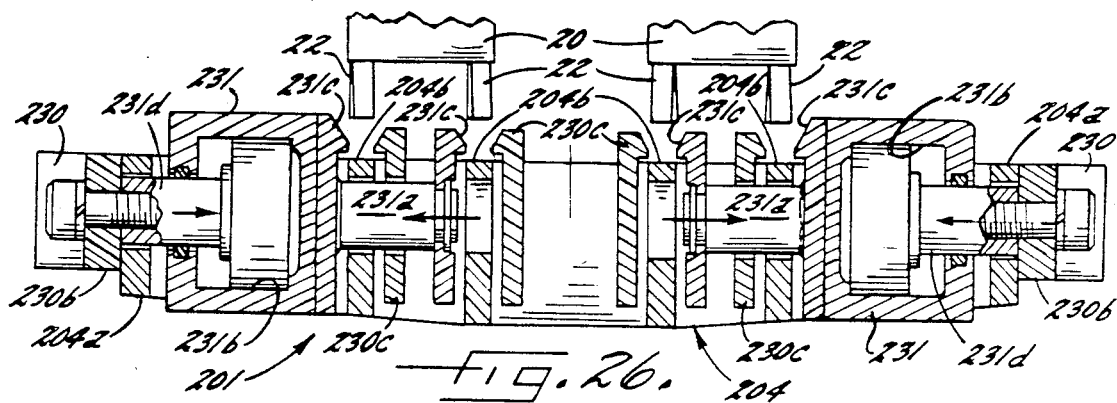
FIGS. 26 and 26a and FIGS. 27 and 27a are enlarged sections taken in the planes of lines 26—26 and 27—27, respectively, in FIG. 24 showing in FIGS. 26 and 27 the alignment device clamps in position to receive the unaligned lugs of elements and in FIGS. 26a and 27a the alignment-device clamps in aligning engagement with the element lugs.
Figure 27:
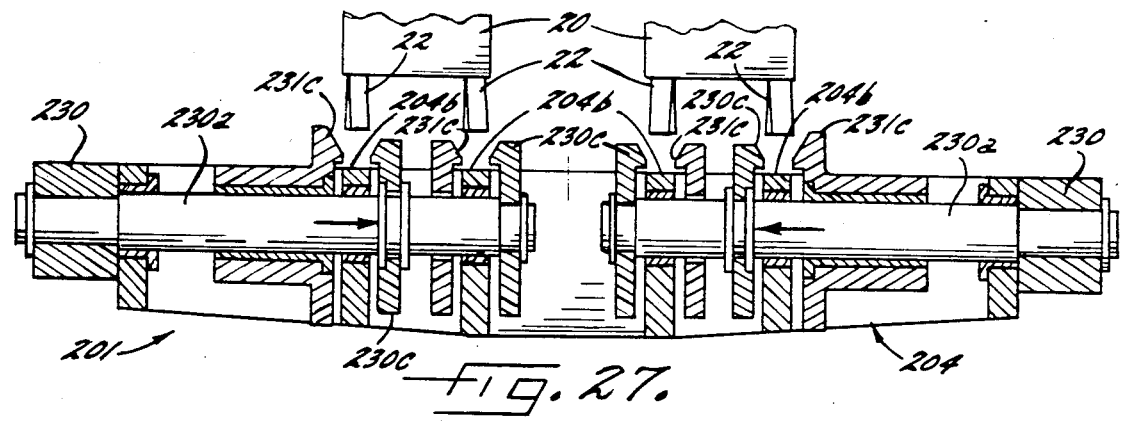
Figure 26A:
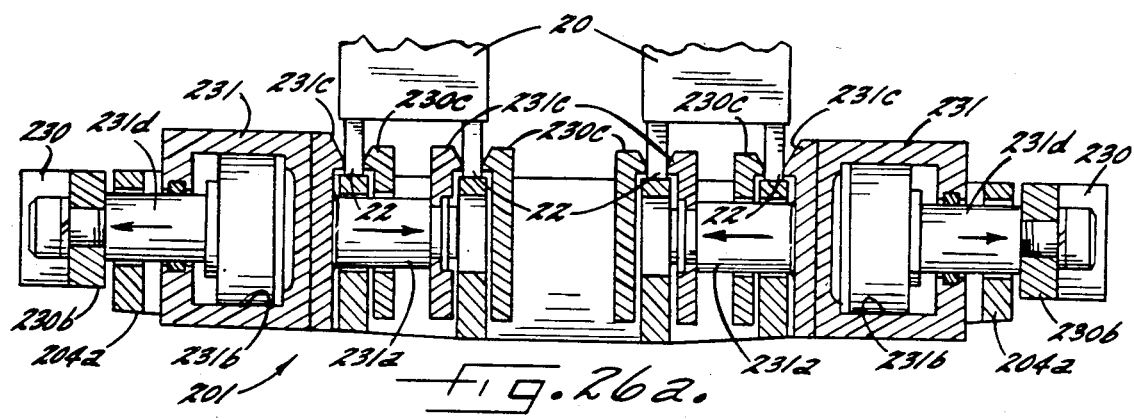
Figure 27A:
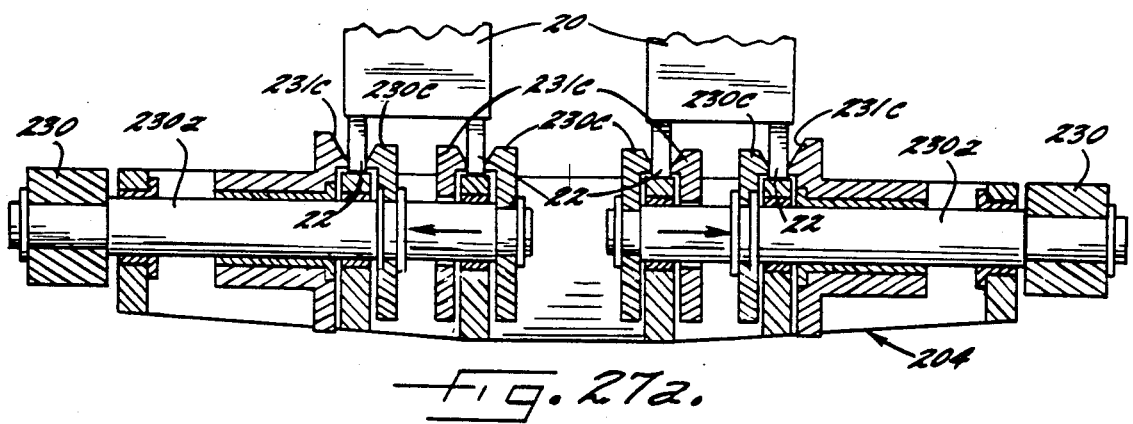

For moving the alignment-clamp assemblies 230, 231 relative to each other to effect clamping and alignment of element lugs positioned on the seating plates 204b, a double-acting air cylinder 231b is mounted on the outermost clamp 231c of the second clamp assembly 231 and has a piston rod 231d extending outwardly of the frame extension 204b which is secured to the tie bar 230b of the first clamp assembly 230. When the cylinder 231b is actuated to move the rod 231d inwardly, as shown in FIGS. 26 and 27, the tie bar 230b, shafts 230a and clamps 230c of the assembly 230 are pulled inwardly, while the cylinder 231b and clamps 231c of the second assembly 231 are forced in an outer direction by the reaction forces, thereby causing the pairs of clamps 230c, 231c to be moved oppositely to their open positions which permits unaligned lugs of elements (FIGS. 26, 27) held in the carousel station to be placed onto and removed from the alignment-head seating plates 204b. Upon actuation of the cylinder 231b in the opposite direction, illustrated in FIGS. 26a and 27a, extension of the piston rod 231d forces the bar 230b, shafts 230a, and clamps 230c of the first assembly in an outer direction while the reactionary forces move the cylinder 231b, shaft 231a, and clamping plates 231c of the second assembly 231 inwardly, thereby clamping the element lugs 22 positioned on the seating plates 204b and forcing them into substantial longitudinal alignment. Following such alignment, the carousel station elevator head 60 will re-engage the elements, the lug-alignment head 201 will release the elements, the lug-alignment head 201 will be lowered, and the carriage 202 will retract the alignment-head 201 from the carousel station.

It will be appreciated that by aligning the lugs 22 of elements 20 in the foregoing manner that elements may be previously assembled, transferred along the delivery conveyor 31 to the carousel 35, and loaded into the carousel without concern for precise lug alignment. Following alignment of the lugs at the carousel alignment station 45B, it will be seen that the elements will thereafter be held in the elevator head 60 in such aligned condition throughout the casting operation.

Upon completion of the lug-alignment operation, the electrical contact-clamps 120 and the logic connector 65a at the alignment station may be disconnected from the carousel station to permit its indexing to the lead-pour station 45C. Prior to such indexing, the master controller 85 for the apparatus, to be described later, will determine whether the mold 61 carried at such station has been heated to high temperature set-point of the temperature controller 131, and if not, the carousel station will be retained at the alignment station until such mold preheat temperature is reached. Upon indexing of the carousel station 40 to the lead-pour station 45C, the heat control-clamps 120 and the logic connector 65a of that station are coupled to the carousel station.

Figure 28:
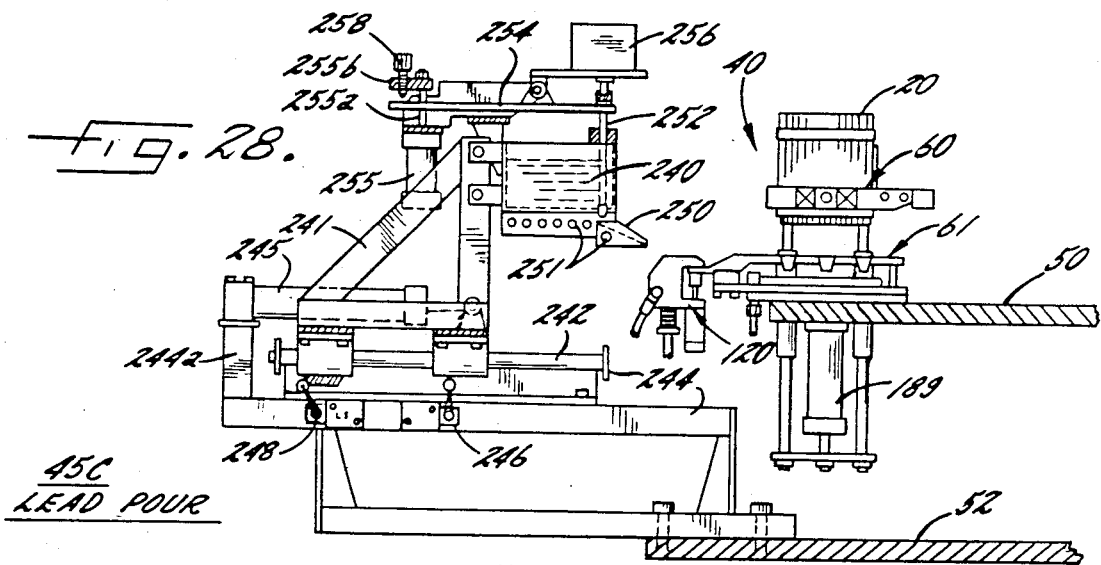
FIG. 28 is an enlarged vertical section of the lead-pour station of the illustrated machine, taken in the plane of line 28—28 in FIG. 3.
Figure 28A:
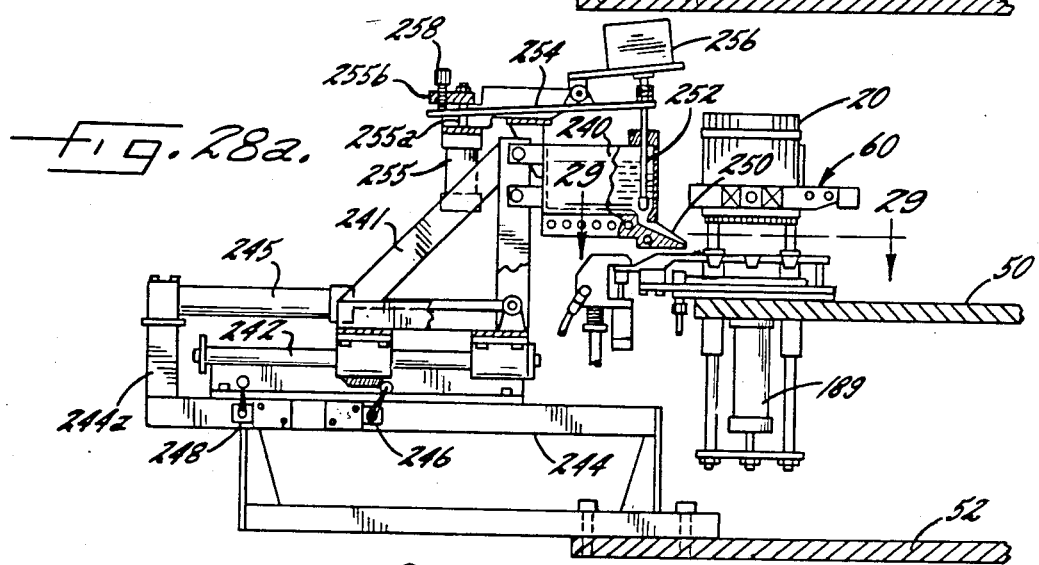
FIG. 28a is a vertical section, similar to FIG. 28, but showing the molten-lead containing ladle in an advanced mold filling position.

The lead-pour station 45C, shown in FIGS. 28, 28a and 29, includes a molten-lead containing ladle 240 supported by a carriage 241 which in turn is supported for sliding movement to and from a carousel station 40 on guide rods 242. The guide rods 242 are mounted on a support bracket 244 extending outwardly of the frame plate 52. For moving the ladle 240 from a retracted position, shown in FIG. 28, to an advanced pouring position, shown in FIG. 28a, a double-acting air cylinder 245 is mounted between the ladle carriage 241 and an upstanding plate 244a of the outwardly extending support-bracket 244. Limit switches 246, 248 mounted on the support-bracket 244 sense the respective advanced and retracted positions of the ladle 240.

The illustrated ladle 240 has four pouring spouts 250 and is adapted to simultaneously dispense controlled quantities of molten lead through the spouts into respective elongated sections 105 of each mold 61 advanced to the lead-pour station. The ladle 240 and spouts 250 in this case each have electrical heating elements 251 for maintaining the molten lead at a temperature above its melting point. To control pouring of the molten lead into the molds, each spout 250 has an associated vertically disposed valve rod 252. For raising the valve rods 252 from a seated closed position, shown in FIG. 28, to a raised lead-pour condition, shown in FIG. 28a, the valve rods are suspended from the underside of one end of a pivot plate 254, the other end of which is secured to the rod 255a of an air cylinder 255. As is known in the art, a controlled quantity of lead can be dispensed through the respective spouts 250 by controlling the timing and stroke of the cylinder 255 and the depth of the molten lead in the ladle. Adjustable stops 258 in this case are mounted on a rod extension 255b for limiting opening movement of the valve rods from their respective seats. To ensure prompt and reliable valve closing following the lead pouring, a weight 256 is mounted on the plate 254 above the valve rods 252.

Following the lead-pour operation, the ladle 240 may be returned to its retracted position, shown in FIG. 28, the lead-pour station heat-clamps 120 and logic connectors 65a disconnected from the carousel station, and the carousel station indexed to the fluxing station 45D where the logic connectors and heat-clamps of that station are coupled to the carousel station.

The fluxing station 45D, shown in FIGS. 30–32, includes a carriage 260 having a pair of trays 261 mounted forwardly thereof for translational movement with the carriage to and from a carousel station and vertical movement relative to the carriage in a manner similar to the alignment head discussed previously. The trays 261 are mounted on a tray-support frame 262 suspended from the underside of the carriage and each contain a sponge 261a wetted with a suitable flux for enhancing bonding of molten lead, or whatever material is being cast, to the element lugs. The carriage 260 has guide rods 264 on the underside thereof supported in linear bearing blocks 265 which in turn are mounted in a support bracket 266 extending from the machine plate 52. A rearwardly directed double-acting air cylinder 268 is supported between the support-bracket 266 and a carriage bracket 269 such that retraction of the rod 268a through actuation of the cylinder 268 will move the carriage 260 from a retracted position, shown in FIG. 30, to an advanced position, shown in FIG. 30a, with the flux trays 261 disposed below the carousel station elevator head 60 and the respective elements 20 supported to therein. The forward and retracted positions of the carriage 260 are sensed by a limit switch 270 actuated by forward and rearward carriage-locating stops 271, 272, respectively.

With the flux trays 261 positioned below the elements 20 in a carousel station, the trays may be raised through actuation of a cylinder 274 such that the flux wetted sponges 261a contained in the trays 261 contact the lugs 22 of the respective elements. The flux tray support frame 262, similar to the alignment-head frame of the alignment station, is suspended from the underside of the carriage 260 by depending guide posts 275 and secured to the end of the depending rod end of the cylinder 274. A switch 273 is provided for sensing the raised position of the trays.

Following fluxing of the element lugs 22, the flux trays 261 are returned to their lowered position and retracted from the carousel station 60, allowing the carousel station to then be indexed to the casting station 45E. The master controller 85 for the machine, again as will be described later, will effect disengagement of the logic connectors 120 and heat control clamps from the carousel station and indexing of the carousel station to the casting station 45E only if the mold 60 is above the determined high temperature set-point of the temperature controller 131. If the mold temperature is below such temperature, the carousel station 60 will be retained at the fluxing station 45D until the proper mold temperature is achieved.

In carrying out the invention, upon indexing of the carousel station to the casting station, the carousel station elevator head can be lowered to immerse the element lugs in molten lead contained in the mold, and immediately in response thereto, cooling means comprised forced-air mold cooling is actuated for cooling the mold and the molten lead. Other cooling means may, as is well known in the casting art, be utilized.

The illustrative forced-air cooling has been found to provide a relatively quick, efficient and reliable method of cooling. The molten strap material can thus be cooled down well below its solidification temperature in about 30 seconds or so. The materials used for the lugs and the strap, the temperature of the molten strap at the time the lugs are immersed therein and the rate of cooling after immersion of the lugs should be coordinated such that satisfactory fusion between the lugs and the strap results and excessive melting of the lugs does not occur. Also, the cast strap should be solidified and cooled sufficiently so that the resulting cell element can be further processed as desired without adversely affecting the fused bonds between the lugs and the straps to any significant extent.

In the illustrated apparatus, following coupling of the casting station logic connector 65a to the carousel station, the elevator head air cylinder 189 is actuated to extend the piston rod 189a thereof drawing downwardly the tie bar 188, the guide rods 185, the elevator head 60, and the elements 20 held therein such that the element lugs 22 are lowered into the mold 61 and immersed in molten lead which fuses to the lugs (FIGS. 33–36). For actuating the elevator cylinder 189, air lines 280 connect the cylinder to the double-actuating solenoid air-control valve SOL-2a, SOL-2b for the respective carousel station (FIG. 7) which in turn is controlled by the master controller of the apparatus, as will be described later. A proximity switch 283 mounted on the frame 52 is actuated by the elevator head 60 reaching its lowermost position, which generates a signal to the master controller indicating that the head is down.

Upon such actuation of the solenoid-control valve SOL-2a, SOL-2b, resulting pressurization of the air line to the elevator cylinder 189 closes a pressure switch 281 (FIG. 7) which in conjunction with carousel station circuitry, also to be described later, will actuate the cooling-air control-solenoid valve SOL-1 allowing air to be discharged through and out of the air-cooling tube assembly 62 of the carousel station. The cooling-tube assembly 62 in this case includes a plurality of elongated air-cooling tubes 62a disposed under and in closely spaced relation to the respective elongated mold sections 105, as shown in FIGS. 34–36. In the illustrated embodiment, the pair of cooling-tubes 62a for the two elongated mold sections 105 for each element are disposed slightly between the corresponding mold sections and have air outlet apertures 62b designed to direct air upwardly and outwardly at a slight angle with respect to each other so as to impinge the bottom surfaces of the two elongated mold sections 105. It will be appreciated that the thin-walled suspended mold sections 105 are susceptible to relatively quick and uniform forced-air cooling. To prevent build-up of spilled molten lead about the air-cooling tubes 62a, the mold mounting plate 114 has a tapered central opening 114a through which lead spatter may fall.

To couple the air cooling tubes 62a to the cooling-air control solenoid valve SOL-1 for the carousel station, the pairs of cooling-tubes 62a on each side of the mold are directed to a respective common manifold block 62c at their end adjacent the outer periphery of the carousel table 50 and each manifold block 62c in turn is coupled to an air supply line 62d directed under the carousel table to a T-fitting 62e which in turn is coupled to the control valve SOL-1.

Following lowering the elevator head 60 at the casting station 45E and actuation of the cooling air, the casting station logic connector 65a may be disengaged from the carousel station so as to permit indexing of the carousel station to the successive cooling stations 45F, 45G, 45H, and 45I. Since the air flow through the cooling-tubes 62a is effected independent of operating station logic control and without the necessity for mold heating, neither logic connectors 65a nor electrical contact-lamps 120 in this instance are provided at the four illustrated cooling stations. The carousel station elevator head 60 will be indexed through the successive cooling stations in its lowered casting position, and cooling air will continue to be directed through the cooling-tube assembly 62 until the mold has been cooled to the predetermined low temperature set-point of the temperature controller 181, at which temperature the cast straps will have solidified and fused to the element lugs and the cooling-air solenoid control-valve SOL-1 for the station will be deactivated to halt the forced air cooling.

Upon the carousel station reaching the elevator head-up station 45J and being engaged by the logic connector 65a of that station, if the mold temperature has been cooled to the predetermined low temperature set-point so that the forced air has been terminated, the elevator head cylinder 189 will be actuated to cause the elevator head 60 to raise the elements out of the mold 61 with the straps cast thereon, as illustrated in FIGS. 38 and 39. If the mold temperature has not yet been lowered to the low temperature set-point upon reaching the elevator-up station 45J, the elevator head 60 will remain in the lowered casting position at that station with the cooling air actuated until the mold is cooled to the low set-point level. Upon such raising of the elevator head 60, a photo cell 285 mounted adjacent and slightly above the mold 61 will make light contact with its reflective plate 285a (FIGS. 7, 38, and 39) signalling that the elevator head 60 has been raised, permitting the logic connectors 65a to be disengaged from the carousel station and the carousel station to be indexed to the terminal-cell element unloading station 45K.

The terminal-cell element unloading station, depicted in FIG. 3, includes an element transfer mechanism 140a similar to the loading station element transfer mechanism 140. Upon indexing of a terminal-cell element station 40T to the terminal-cell element unloading station 45K, and the coupling of operating station logic connector 65a to the carousel station, the transfer mechanism 140a will extend its transfer-arm head to engage the completed terminal-cell element 24T held in the carousel station elevator head in inverted position, the carousel station elevator head 60 will release the elements, and the transfer arm will be retracted, pivoted, and extended to position the completed terminal cell elements 24T in their upright position on the discharge conveyor 36.

Intermediate-cell element carousel stations 40I, on the other hand, will be indexed through the terminal-cell element unloading station 45K without element removal. Upon indexing of an intermediate-cell element carousel station 40I to the intermediate-cell element unloading station 45L, a transfer mechanism 140b, again similar to the terminal-cell element unloading transfer mechanism 140a, will remove the completed intermediate-cell elements 24I and transfer them in upright position onto the intermediate-cell element discharge conveyor 38. In the illustrated embodiment, electrical contact-clamps 120 are provided at the intermediate-cell element unloading station 45L for engaging the mold at that station to start the progressive mold preheating process for the next casting cycle. After leaving the intermediate-cell element unloading station 45L, the empty carousel station is then indexed to the loading station 45A for receiving elements for repeat of the cycle.

Control means is provided for coordinating each of the operating and carousel stations to carry out the successive casting operations under optimum casting conditions and on a continuous basis. As diagrammatically illustrated in FIG. 40, the control means includes a master controller 85 which may comprise a conventional microprocessor-based programmable controller, such as a Gould Modicon 484 Programmable Controller, having a processor portion 290 and a memory portion 291 appropriately programmed to effect the sequential operations as hereinafter described. The master controller 85 in this case is adapted to communicate with each carousel station 40 through the slip ring assembly 86 on the carousel and through successive operating station logic connectors 65a. The master controller 85 also communicates with and directly controls functions at the operating stations 45. In each instance the master controller 85 communicates through conventional input and output modules which convert incoming signals from the various sensing devices of the apparatus to signal levels compatible with the controller and which convert output signals of the controller to signal levels compatible with the apparatus. In the illustrated embodiment, control means is further provided, as will become apparent, for permitting selected manual operation of certain of the operations.

Figure 41:
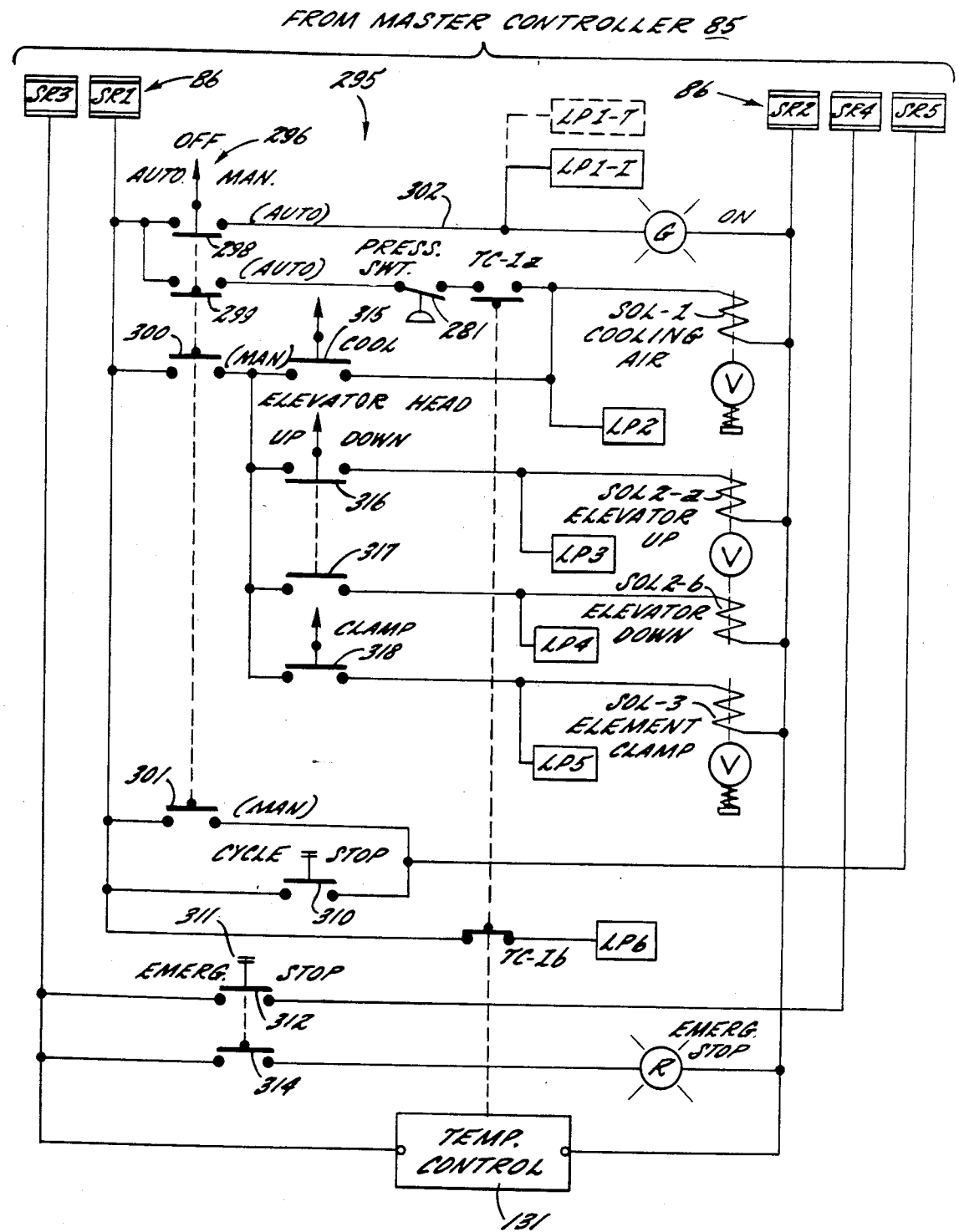
FIG. 41 is an electrical circuit diagram of a typical carousel station.

Referring now to FIG. 41, there is shown an electrical circuit 295 for each carousel station 40 which enables automatic operation of the apparatus under the control of the master controller 85, or selective manual operation of a particular carousel station. The circuit 295 in this case is coupled to the master controller 85 by the carousel slip rings SR1–SR5 and by logic pins LP1–LP6 of a logic connector 65a at an operating station. Upon movement of a main ganged switch 296 to an "auto" position, switch contacts 298, 299 are closed while switch contacts 300, 301 are simultaneously opened. Upon closure of switch contact 298, current is conducted through line 302 between slip rings SR1 and SR2, energizing a station-on light "G" and providing a signal to the master controller 85 through logic pin LP1-I indicating that the station is "ON" and that the station is an intermediate-cell element station 40I. In the case of a terminal-cell element station 40T, a signal is conducted through logic pin LP1-T to the master controller.

When a carousel station is at the loading station 45A at the beginning of a cycle of operation, the master controller 85, communicating through logic pins LP3 and LP5, shall previously have energized solenoid SOL-2a to raise the carousel station elevator head 60 to its upper position and energized solenoid SOL-3 to permit return of the elevator head clamping bars 192 to their open, or element releasing and receiving position. After elements are positioned into the elevator head at the loading station 45A, the programmed operation of the master controller 85 communicating through logic pin LP5 will de-energize solenoid SOL-3 to clamp the elements in the elevator head. Programmed signals from the master controller 85 through logic pin LP5 similarly effect opening and closing of the elevator head clamps at the alignment station.

For controlling various of the operations in response to the temperature of the mold at each carousel station, the temperature controller 131 is connected between slip rings SR3 and SR2 and has a low set-point for controlling a normally opened, low-temperature control, contact TC-1a and a high set-point for controlling a normally closed, high-temperature control, contact TC-1b. By setting the temperature controller at appropriate high and low set-points, as previously described, contact TC-1a will close when the mold temperature is above the low set-point and contact TC-1b will open when the mold temperature is above the high set-point.

Early in the operating cycle, such as when the carousel is at the loading station 45A, the mold will previously have been cooled to a temperature below the low set-point, causing the high-temperature control contact TC-1a to be in a closed condition and the low-temperature control contact TC-1b to be open. Closure of contact TC-1b generates a signal to the master controller 85 through logic pin LP6 that heat is required, and in response thereto the master controller 85 will cause the energization of an operating station electrical contact-clamps 120 coupled to the carousel station to effect mold preheating. When the mold preheat temperature reaches the high set-point, which may occur at any of the successive operating stations where the mold is heated, contact TC-1b will open providing a signal to the master controller 85 through logic pin LP6 for de-energizing the electrical contact-clamps 120 of the operating station. Upon the carousel indexing to the casting station with the mold at the requisite preheated temperature, the master controller 85 will generate a signal through logic pin LP4 to energize solenoid SOL-2b for lowering the carousel station elevator head into casting position. Lowering of the elevator head will simultaneously close the normally open pressure switch 281 which, together with the already closed low-temperature contact switch TC-1a, will complete the circuit between slip rings SR1 and SR2, energizing solenoid SOL-1 to initiate forced air mold cooling, which in turn is sensed by the master controller 85 through logic pin LP2.

Since the cooling-air control solenoid SOL-1 is connected between carousel slip rings SR1 and SR2, the cooling air will remain on as the carousel station progresses through successive cooling station 45F–45I without logic connection with the master controller 85. Upon the mold being cooled to the low temperature set-point at any time during its passage through the cooling stations, or after its arrival at the elevator-up station 47J, contact TC-1a will open, thereby de-energizing solenoid SOL-1 and terminating the forced-air cooling.

When the carousel station is indexed to the elevator-up station 45J and is connected to the master controller through the logic connectors of such station, and the mold temperature is below the low temperature set-point, the open condition of the low-temperature contact TC-1a will be sensed by the master controller 85 through logic pin LP2. In response thereto, the master controller 85 will generate a signal through logic pin LP3, thereby energizing solenoid SOL-2a to raise the elevator head and lift the elements from the mold. Upon indexing of the carousel station to the appropriate unloading station, the master controller 85, communicating through logic pin LP5, will again energize the elevator head-clamping solenoid SOL-3 for element unloading.

It can be seen, therefore, that during each of the foregoing carousel station operations logic pins LP3, LP4, and LP5 are inputs to the carousel station from the master controller 85 for controlling raising, lowering, and clamping operations of the elevator head, respectively, while logic pins LP1, LP2, and LP6 are inputs to the master controller 85.

The circuit 295 further permits stopping operation of the apparatus at the end of a cycle, or alternatively, on an instantaneous emergency basis. To this end, a switch 310 coupled between slip rings SR1 and SR5 may be manually closed to generate a signal to the master controller 85 through slip ring SR5 in response to which the master controller will cause the apparatus to come to an orderly completion of the existing cycle, while continuing to heat or cool as required by the temperature controller 131. Manual actuation of an emergency stop switch 311, on the other hand, will close contacts 313, 314 generating a signal to the master controller 85 through slip ring SR4, in response to which operations of the carousel and operating stations are immediately halted, major power to the apparatus is cut off, and the emergency stoplight "R" is energized.

To permit selected manual operation of certain of the carousel station functions, the switch 296 may be moved to its manual position, opening contacts 298, 299 and closing contacts 300, 301. Manual switches 315, 316, 317 and 318 may then be selectively actuated to energize the respective control-solenoids SOL-1, SOL-2a, SOL-2b and SOL-3 for actuating cooling air, and elevator head-up, elevator head-down and elevator head-clamping conditions.

In view of the foregoing, a programmed operating sequence of the entire apparatus 30, under control of the master controller, is as follows. In the following discussion, it will be understood that while various of the operating stations 45 may have individual power and air supplies, the limit switches and sensors at the operating stations referred to herein as adapted to permit communication to the master controller 85, and in response to such communications, the master controller is adapted to carry out the successive programmed functions in the manner and sequence described.

Starting at the loading station 45A with two elements in the normal upright position at the discharge end of the delivery conveyor 31 against extended stop-pins 151a and the transfer mechanism arm 155 retracted and the clamping-head 158 thereof in an open, or element receiving, condition on the conveyor side of the transfer mechanism 140, the transfer-arm 155 is extended by the actuation of cylinder 172 to move the clamping-head 158 into element-receiving position at the delivery conveyor, thereby opening magnetic switch 174 and converging beam switch 181 (FIG. 14); the stop-pins 151a are retracted by the actuation of cylinders 151; the transfer-arm clamping head 158 engages the two elements 20 on the delivery conveyor by the actuation of cylinders 165, 166; the transfer-arm 158 is retracted by the actuation of cylinder 172 removing the elements engaged therein from the delivery conveyor, thereby making magnetic switch 174 and converging beam switch 181 (FIG. 15); and photocells 152 sense the removal of the elements from the delivery conveyor 31 and the stop-pins 151a are returned to their extended position by the actuation of cylinders 151. The transfer-arm 155 is then rotated 180° vertically by the actuation of the rotary actuator 179 to position the clamping-head 158 on the carousel side of the transfer mechanism with elements 20 held therein in inverted position, opening magnetic switch 174 and closing magnetic switch 175.

Upon an open carousel station 40 being indexed to the transfer station 45a the master controller 85 effects a carousel "station engagement sequence" that includes engaging logic connectors 65a and electrical contactor-clamps 120 with the carousel station, and preheating the mold upon demand, as determined by the temperature controller 131, communicated to the master controller 85 through the logic connectors. With the elevator head-clamping bars 192 in their open, or element-receiving positions, the transfer-arm 155 is extended to move the elements in inverted position into the elevator head, thereby opening magnetic switch 175 converging beam switch 180 (FIG. 19); the elevator head-clamping bars 192 are moved to their element-clamping positions by the actuation of cylinders 194; the transfer-arm clamping head 158 releases the elements by the reverse actuation of cylinder 165 and de-activation of cylinders 166; and the transfer-arm 155 is then retracted, thereby leaving the elements held in the carousel station elevator head 60, and making magnetic switch 175 and converging beam switch 180 (FIG. 20).

A signal is subsequently generated to the master controller 85 indicating that the loading station 45A is ready for indexing; the master controller waits until all carousel stations are ready for indexing; and at that time generates a "station disengagement sequence", including de-energizing power to the electrical contact-clamps 120, disengaging the heat contact clamps, disengaging the logic connector 65a, waiting for all operating station logic connectors to be down, and checking that all operating station heads are in retracted positions away from the carousel. Upon completion of the "station disengagement sequence", the carousel is rotated 30° by the indexer 51 advancing each carousel station to a succeeding operating station.

Figure 23:
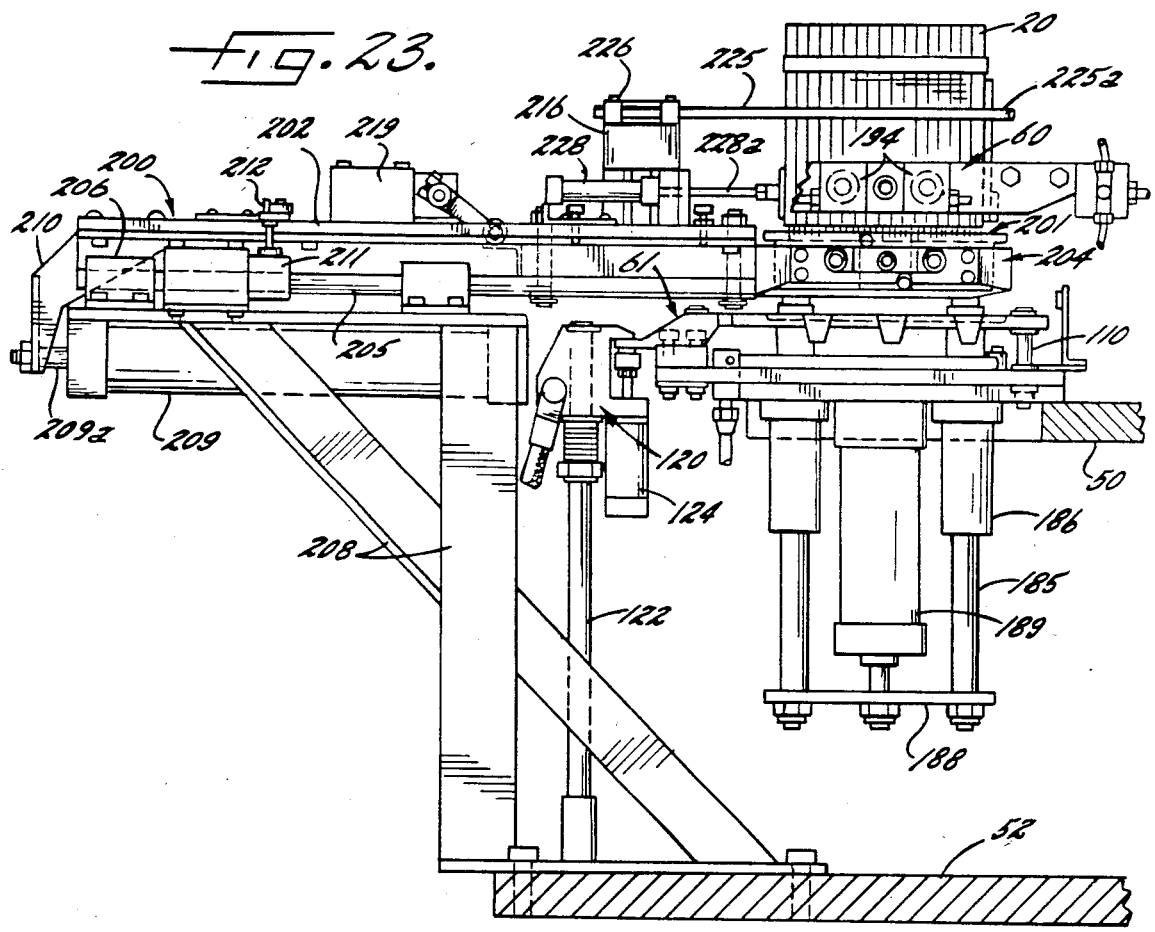
FIG. 23 is an enlarged elevational view of the element lug alignment device at the alignment station in operative position for aligning lugs of cell elements carried by a carousel station.
Figure 25:
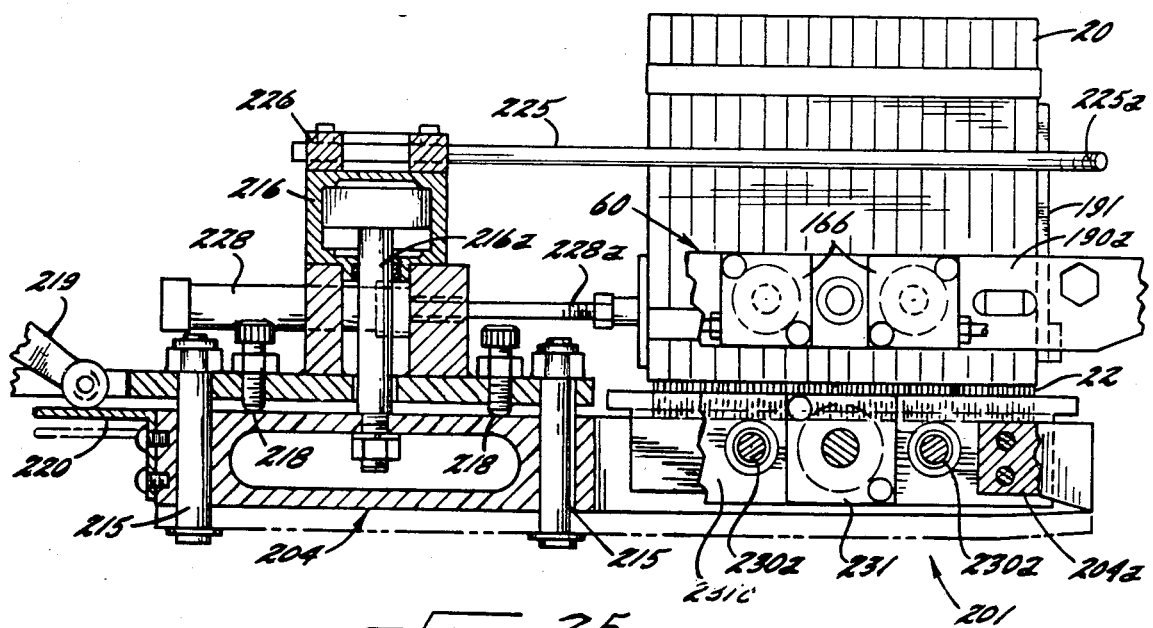
FIG. 25 is an enlarged vertical section of the element lug-alignment device taken in the plane of line 25—25 in FIG. 24.

Upon indexing the carousel station to the alignment station 45R, the master controller 85 will again process a "station engagement sequence", as referred to above. The alignment-head 201 then is moved with its carriage 200 by the actuation of cylinder 209 from a retracted position (FIG. 22) to an extended position below the elevator head and the elements carried therein (FIG. 23) making limit switch 211; the alignment head is raised by the actuation of cylinder 216 to a position in which the seating plates 204b thereof are in close proximity with the lugs 22 of the elements supported by the elevator head 60, making limit switch 219; the elevator head-clamping bars 192 are opened by the de-activation of cylinders 166 allowing the elements to drop onto the alignment-head seating plates 204b; the element-positioning plunger rods 228a are extended by the actuation of cylinders 228 to locate the elements firmly against the elevator head rear reference plate 191; the alignment-head clamps 230c, 231c are moved into lug engagement and aligning positions by the actuation of cylinders 231b (FIGS. 26a, 27a); the elevator head-clamps 192 (FIG. 20) re-engage the elements by the actuation of cylinders 194; the alignment-head clamps release the element lugs 22 by the reverse actuation of cylinders 231b (FIG. 26a); the element-positioning plunger rods 228a are retracted by the reverse actuation of cylinder 216 (FIG. 25); and the alignment-head 201 is lowered by the reverse actuation of cylinder 216, thereby opening switch 219 and is then retracted from the carousel station, with its carriage 202, thereby closing limit switch 211, as shown in FIG. 23. Upon the mold being preheated to the high temperature set-point of the temperature-controller 131 and such temperature being sensed by the master controller 85 through the logic connection, an alignment station "ready-to-index" signal is generated, and following a "station disengagement sequence" as referred to above, the carousel is indexed to the next station.

Upon the carousel station being indexed to the lead-pour station 45C, the master controller again will process a "station engaging sequence", the carriage 241 will move the ladle 240 from a retracted position (FIG. 28) to a lead-pour position (FIG. 28a), thereby making switch 246; the ladle valve rods 252 are raised to their open positions by the actuation of cylinder 255 to permit molten lead to flow into the molds and in a timed sequence, returned to their closed positions by the deactivation of cylinder 255; the ladle carriage 241 is retracted by the actuation of cylinder 245, thereby making switch 248; a lead-pour station "ready-to-index" signal is generated; a "station disengagement sequence" is carried out; and the carousel is indexed to the succeeding station.

Upon the carousel station being indexed to the fluxing station 45D, a "station engagement sequence" is effected; the carriage 260 is advanced by the actuation of cylinder 268 from a retracted (FIG. 30) to an extended position, thereby making switch 270, with the flux trays 261 disposed below the carousel station elevator head 60 and the elements carried therein (FIGS. 30a, 31); the flux trays 261 are elevated relative to the carriage 260 by the actuation of cylinder 274 to apply flux to the element lugs, thereby making switch 273; the flux trays 261 are lowered relative to the carriage 260 by the reverse activation of cylinder 274, thereby opening switch 273; and the carriage 260 and flux trays 261 are retracted by the actuation of cylinder 268, thereby opening switch 270. Upon the mold being heated to the high temperature set-point of the temperature-controller 131 and this temperature being sensed by the master controller 85 from the logic connection with the operating station, a flux station "ready-to-index" signal is generated to the master controller, which, following a "station disengagement sequence," will cause the carousel station to be indexed to the next operating station.

Upon the carousel station being indexed to the casting station 45E, the master controller again will process a "station engagement sequence," in this case without heat contact-clamp engagement at the casting station, and the elevator head 60 will be lowered, by the actuation of cylinder 189, to immerse the element lugs into the molten lead contained in the mold, thereby closing pressure switch 281 and proximity switch 283 (FIG. 7). Upon closure of switch 281, the cooling-air control valve SOL-1 is opened to permit cooling air to be directed through the tubes 67a onto the molds, which continues upon demand as sensed by the temperature controller 131. A casting station "ready-to-index" signal is then generated, and following a "station disengagement sequence," the carousel station is indexed to the first cooling station 45F with the elevator head 60 thereof remaining in its lowered, or casting position.

The carousel station is successively indexed through each of the four cooling stations 45F, 45G, 45H and 45I independent of logic connection with the master controller 85 or electrical contact-clamp connections with the operating station. Upon the temperature of the mold being lowered to the low set-point of the temperature-controller 131, the cooling-air solenoid valve SOL-1 is de-energized to terminate further forced air mold cooling.

Upon the carousel station being indexed to the elevator head-up station 45J, a "station engagement sequence" is effected, again without heat-clamp engagement. If the mold has not been cooled to the low-temperature control set-point prior to reaching this station, cooling will continue until that temperature is reached. Upon the mold being sensed at the low-temperature set-point, the elevator head 60 is raised by the actuation of cylinder 189. Upon the elevator head-up position being verified by photoreflective sensors 258, an elevator head-up station "ready-to-index" signal is generated. Following a "station disengagement sequence," the carousel is indexed to the next station.

Upon a terminal-cell element carousel station 40T being indexed to a terminal-cell element unloading station 45K, the "station engagement sequence" again is effected without heat-clamp engagement. The terminal cell element transfer mechanism 140a at this station, as indicated previously, is identical to the loading station transfer mechanism and operates in reverse sequence in engaging completed terminal-cell elements in the carousel station elevator head 60, removing the elements in their inverted position from the elevator head, rotating the elements 180° vertically, and transferring them onto the delivery conveyor in their upright position. In the event an intermediate-cell element carousel station 40I is advanced to the terminal-cell element unloading station 45K, such indexing is sensed by the master controller through the logic connection and such carousel station 40I will be indexed through the terminal-cell element unloading station without element removal.

Upon an intermediate-cell element carousel station 40I being indexed to the intermediate-cell element unloading station 45L, a "station engagement sequence" again is carried out, including heat-clamp engagement for mold preheating. The completed intermediate-cell elements, as previously indicated, are similarly removed from the carousel station elevator head by the transfer mechanism 140b, inverted and deposited on the intermediate-cell element delivery conveyor 38. Terminal-cell element carousel stations 40T are automatically indexed through this operating station. In either case, an intermediate-cell element unloading station "ready-to-index" signal will then be generated, the "station disengagement sequence" effected, and the carousel station indexed to the loading station for repeat of the cycle.

The foregoing has illustrated one embodiment in which the method of casting straps utilizing the resistance heating of the mold pursuant to the present invention can be employed. In the illustrative embodiment, the method employed includes preheating the mold prior to pouring the strap material into the mold. This allows the strap to be cast in a relatively short period of time, insures that the fused bonds which result will be of satisfactory quality and obviates any practical criticality in the timing of inserting the lugs into the molten strap material since the temperature of such material can be readily maintained at the desired casting temperature.

However, there may be applications where either the time required for casting the strap is not critical or it is desired to control the amount of the strap material within limits not readily achieved when molten material dispensing apparatus is used. In such applications, the method of casting the strap can be carried out by placing the desired quantity of the strap material into the mold, heating the mold by electrical resistance heating to the desired casting temperature, immersing a portion of the lugs into the molten strap material and then cooling to solidify the strap. Indeed in such applications, it might be possible to provide the material for the desired strap from material melted from the lugs. More practically, it may be more desirable in such situations to add part of the material for the strap in solid form and then obtain the remainder from material melted from the lugs.

Regardless of the manner in which the casting of the strap is achieved, the present invention provides a facile method in which the resulting fused bonds between the strap and the lugs should be of more than adequate quality. Moreover, the problems identified with prior casting techniques, such as, for example, the requirement for close timing of the insertion of the lugs into the molten strap material, can be readily obviated.

We claim:

1. A method of casting metal straps on rows of lugs of battery cell elements, comprising:
    providing a mold body made of electroconductive material and formed with a plurality of of parallel electrically interconnected sections each formed with an elongated strap cavity, conducting electrical current in series through the material of said mold cavity sections for heating said sections to a predetermined temperature in excess of the melting temperature of the metal to be cast, introducing metal in an amount adequate for forming a strap into each said cavity, immersing a row of element lugs into each said cavity, cooling said mold body to a temperature below the solidification temperature of said metal, and removing said element lugs from said cavities with straps cast thereon.

2. The method of claim 1, wherein the mold body is heated to said predetermined temperature prior to introducing the strap metal into said cavities, the strap metal is introduced into said cavities in molten form at about said predetermined temperature, and the lugs are immersed into said cavities when the molten strap metal is at about said predetermined temperature.

3. The method of claim 1, wherein said strap metal is introduced into said cavities in solid form and said mold body is thereafter heated to said predetermined temperature.

4. The method of claim 1, wherein said predetermined temperature is about 720° F.

5. The method of claim 1, wherein said cooling includes directing forced air onto said mold section.

6. The method of claim 1, including monitoring the temperature of said mold body and intermittently conducting electrical current through said mold body as required to maintain said predetermined temperature.

7. The method of claim 1, including applying flux to said lugs prior to immersing into said cavities.

8. A method of casting metal straps on lugs of battery cell elements including the steps of providing a mold body formed with a plurality of parallel electrically interconnected elongated strap cavity sections made of an electroconductive material having a sufficient resistivity to create desired heating upon the conduction of electrical current therethrough, conducting electrical current in series through the material of said cavity sections for substantially uniformly heating the cavity sections to a predetermined temperature above the melting point of the metal to be cast, introducing the metal to be cast into the mold cavity of each section at about said predetermined temperature, cooling said mold body to a temperature below the solidification temperature of said metal, and removing the element lugs from the mold cavities following said cooling with straps cast thereon.

9. The method of claim 8, wherein said cavity sections are disposed in lateral spaced apart relationships.

10. The method of claim 9, wherein said cooling includes directing forced air into the space between said mold sections.

11. The method of claim 8, including monitoring the temperature of said mold body and intermittently conducting electrical current through said mold body as required to maintain said predetermined temperature.

12. An electrically heatable mold for casting straps on respective rows of lugs of like polarity plates of battery cell elements comprising a body having a plurality of parallel elongated sections made of a electroconductive material, said elongated sections each having a cavity for receiving a row of lugs of a battery cell element and metal for providing a strap interconnecting the lugs of said row, said body having electrical terminal means and said sections being electrically interconnected such that upon coupling of said terminals to an electrical source, current is conducted in series through the material of said cavity sections to effect relatively uniform resistance heating of said sections.

13. The electrically heatable mold of claim 12, including electroconductive means coupling adjacent ends of said elongated mold sections.

14. The electrically heatable mold of claim 13 in which said terminal means is a terminal end of two of said elongated sections.

15. The electrically heatable mold of claim 14 in which said two terminal ends are located on a common side of said mold.

16. The electrically heatable mold of claim 13 in which said elongated sections and coupling means define an uninterrupted serpentine configuration through which electrical current can be conducted.

17. The electrically heatable mold of claim 16 including a plurality of pairs of said elongated sections, and each said pair of elongated sections having mold cavities for casting straps on a respective pair of rows or lugs of a cell element.

18. The electrically heatable mold of claim 17 in which said coupling means for each pair of elongated mold sections is at one end of the mold and said pair of elongated mold sections are electrically coupled together at an opposite end of said mold.

19. The electrically heatable mold of claim 18 in which the outermost elongated sections each are formed with a terminal end for coupling to said electrical source.

20. The electrically heatable mold of claim 12 in which said body is made of stainless steel.

* * * * *